United States Patent
Ali et al.

(10) Patent No.: US 8,606,319 B2
(45) Date of Patent: Dec. 10, 2013

(54) CARD APPLICATION TOOLKIT SUPPORT FOR IP MULTIMEDIA SUBSYSTEM

(75) Inventors: Syed Hussain Ali, Waterloo (CA); Jean-Philippe Cormier, Ottawa (CA); Andrew Allen, Rolling Meadows, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/384,709

(22) PCT Filed: Oct. 20, 2010

(86) PCT No.: PCT/US2010/053374
§ 371 (c)(1), (2), (4) Date: Jan. 18, 2012

(87) PCT Pub. No.: WO2012/054030
PCT Pub. Date: Apr. 26, 2012

(65) Prior Publication Data
US 2013/0203465 A1 Aug. 8, 2013

(51) Int. Cl.
*H04B 1/38* (2006.01)

(52) U.S. Cl.
USPC .......................................................... 455/558

(58) Field of Classification Search
USPC .......................................................... 455/558
See application file for complete search history.

(56) References Cited

U.S. PATENT DOCUMENTS

| | | |
|---|---|---|
| 2003/0045290 A1 | 3/2003 | Tuohimetsa et al. |
| 2003/0073440 A1 | 4/2003 | Mukherjee et al. |
| 2004/0243680 A1 | 12/2004 | Mayer |
| 2005/0259673 A1 | 11/2005 | Lu et al. |
| 2007/0060097 A1 | 3/2007 | Edge et al. |
| 2007/0207798 A1 | 9/2007 | Talozi et al. |
| 2007/0239857 A1 | 10/2007 | Mahalal et al. |
| 2008/0301785 A1 | 12/2008 | Beyer et al. |
| 2009/0055899 A1 * | 2/2009 | Deshpande et al. ............ 726/4 |
| 2009/0093249 A1 | 4/2009 | Zhu et al. |
| 2009/0209232 A1 | 8/2009 | Cha et al. |
| 2009/0252309 A1 | 10/2009 | Beyer et al. |
| 2009/0319906 A1 | 12/2009 | White et al. |

(Continued)

FOREIGN PATENT DOCUMENTS

| | | |
|---|---|---|
| EP | 1059822 A2 | 12/2000 |
| EP | 1995986 A1 | 11/2008 |
| EP | 2028910 A1 | 2/2009 |
| WO | 2005115028 A1 | 12/2005 |

OTHER PUBLICATIONS

3GPP TS 31.111 V10.2.0 (Apr. 2011); "3rd Generation Partnership Project; Technical Specification Group Core Network and Terminals; Universal Subscriber Identity Module (USIM) Application Toolkit (USAT) (Release 10)"; Apr. 2011; pp. 1-115.

(Continued)

*Primary Examiner* — Temica M Beamer
*Assistant Examiner* — Joel Ajayi
(74) *Attorney, Agent, or Firm* — Fish & Richardson P.C.

(57) ABSTRACT

To consolidate session initiation protocol (SIP) messages a user equipment (UE) is made aware of all Internet Protocol (IP) multimedia subsystem (IMS) applications installed in its memory and on a universal integrated circuit card (UICC) and supported communication services. By obtaining this information before the initial IMS Registration, the UE can save resources by registering all local applications and communication services in single IMS registration.

21 Claims, 20 Drawing Sheets

(56) References Cited

U.S. PATENT DOCUMENTS

| | | |
|---|---|---|
| 2010/0081434 A1 | 4/2010 | Ahluwalia |
| 2010/0085937 A1 | 4/2010 | Pressley et al. |
| 2010/0138525 A1 | 6/2010 | Dong |
| 2010/0248748 A1 | 9/2010 | Dong |
| 2011/0028126 A1 | 2/2011 | Lim et al. |
| 2011/0136471 A1 | 6/2011 | Chen et al. |
| 2012/0115542 A1 | 5/2012 | Griffin et al. |

OTHER PUBLICATIONS

3GPP TS 31.111 V10.3.0 (Jun. 2011); "3rd Generation Partnership Project; Technical Specification Group Core Network and Terminals; Universal Subscriber Identity Module (USIM) Application Toolkit (USAT) (Release 10)"; Jun. 2011; pp. 1-116.

ETSI TS 102 223 V10.2.0 (Mar. 2011); "Smart Cards; Card Application Toolkit (CAT) (Release 10)"; Mar. 2011; 226 pages.

Gemalto, et al.; "BIP Open Channel for IMS"; 3GPP TSG-CT6#53 (C6-090430); Beijing, China; Nov. 10-13, 2009; 14 pages.

Research in Motion UK Limited; "Introduction of the IARI Based Registration Event"; 3GPP TSG CT6 Meeting #59 (C6-110124); Salt Lake City, US; Jan. 22-25, 2011; 20 pages.

Office Action issued in U.S. Appl. No. 13/353,042 on May 17, 2012; 13 pages.

Office Action issued in U.S. Appl. No. 13/353,042 on Jul. 27, 2012; 12 pages.

Extended European Search Report issued in European Application No. 12156767.1 on Sep. 19, 2012; 9 pages.

Extended European Search Report issued in European Application No. 12165685.4 on Sep. 6, 2012; 6 pages.

International Search Report and Written Opinion for PCT Application No. PCT/IB2010/056064, mailed Aug. 29, 2011.

International Search Report and Written Opinion for PCT Application No. PCT/US2010/053374, mailed Jul. 22, 2011.

International Search Report and Written Opinion for PCT Application No. PCT/CA2011/050254, mailed Jan. 6, 2012.

Office Action issued in U.S. Appl. No. 13/352,985 on Mar. 5, 2013; 9 pages.

Nokia Siemens Networks et al.; "Rejection Due to Per APN Congestion"; 3GPP TSG-CT WG1 Meeting #67, C1-105178; Barcelona, Spain, Nov. 19, 2010; 10 pages.

Office Action issued in U.S. Appl. No. 13/352,985 on Dec. 4, 2012; 13 pages.

Office Action issued in U.S. Appl. No. 13/352,985 on Apr. 2, 2012; 9 pages.

\* cited by examiner

US 8,606,319 B2

CARD APPLICATION TOOLKIT SUPPORT FOR IP MULTIMEDIA SUBSYSTEM

BACKGROUND OF THE INVENTION

1. Field of the Invention

The present invention relates in general to data transmission in mobile communications systems and more particularly card application toolkit support for Internet Protocol (IP) multimedia subsystems.

2. Description of the Related Art

In known wireless telecommunications systems, transmission equipment in a base station or access device transmits signals throughout a geographical region known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices. Such advanced or next generation equipment is often referred to as long-term evolution (LTE) equipment, and a packet-based network that uses such equipment is often referred to as an evolved packet system (EPS). An access device is any component, such as a traditional base station or an LTE eNB (Evolved Node B), that can provide a user agent (UA), such as user equipment (UE) or mobile equipment (ME), with access to other components in a telecommunications system.

In mobile communication systems such as an E-UTRAN, the access device provides radio accesses to one or more UAs. The access device comprises a packet scheduler for allocating uplink (UL) and downlink (DL) data transmission resources among all the UAs communicating to the access device. The functions of the scheduler include, among others, dividing the available air interface capacity between the UAs, deciding the resources (e.g. sub-carrier frequencies and timing) to be used for each UA's packet data transmission, and monitoring packet allocation and system load. The scheduler allocates physical layer resources for physical downlink shared channel (PDSCH) and physical uplink shared channel (PUSCH) data transmissions, and sends scheduling information to the UAs through a control channel. The UAs refer to the scheduling information for the timing, frequency, data block size, modulation and coding of uplink and downlink transmissions.

In certain mobile communication systems, there is a requirement for a universal integrated circuit card (UICC) application (e.g., a subscriber identity module (SIM), an Internet Protocol (IP) multimedia subsystem (IMS) SIM (ISIM), and a universal terrestrial radio access network (UTRAN) SIM (USIM)) may make use of Internet Protocol (IP) multimedia subsystem (IMS) functionalities controlled by mobile equipment (ME). See e.g., 3GPP TS 22.101. For example, FIG. 1, labeled Prior Art, shows a block diagram of an operation where a UICC application invites a peer to a session. FIG. 2, labeled Prior Art, shows an example of a UICC to IMS communication. In this example, an IMS UICC user initiated registration is performed where an IMS Subscriber Identity module (ISIM) is present.

It is possible that new UICC to ME command may include an open channel for IMS function which extends known Bearer Independent Protocol (BIP) commands for IMS like Close Channel, Send data, Receive data and Get Channel Status to allow the channel to use the IMS as a means to send and receive IMS traffic to and from the UICC.

In certain known systems (e.g., 3GPP 31.111 v.9.1) the UICC can use the Open Channel request to activate a PDP Context and to send IP data from the UICC to the network on an access point name (APN) chosen by the UICC. This function is in place under hospices of BIP that would allow for IP based over the air (OTA) updating of the UICC to replace the aging short message service (SMS) push and SMS transport currently in use.

This function takes the BIP feature further where the UICC is another IMS application and/or IMS communication service on the UE and as with other applications/communication services requires specific registration with the IMS service using an IMS application reference identifier/IMS communication service identifier (IARI/ICSI).

However, with this function, sending multiple registrations over session initiation protocol (SIP) can be costly for the mobile (e.g., in terms of battery life) and for the network (e.g., in terms of presenting unnecessary load). Additionally, unsolicited SIP messages pushed by the network can also have the same impact.

More specifically, if the a device is unaware of the IARI(s) hosted on the UICC at the time of the first registration of the device, the device will have to perform subsequent registrations when the UICC informs (at a later time) that the UICC wants the ME to initiate an IMS connection. The extra registrations can result in unnecessary and unwanted signaling. After boot up and after the SIP/IMS registration but before receiving the Open Channel command from the UICC; if the ME receives an incoming push message for an application (identified by an IARI) hosted on the UICC, the ME will simply discard any unsolicited messages from the IMS server.

Likewise, if the ME is unaware of the communication services (e.g., ICSI(s)) supported by applications contained within the UICC at the time of its first registration the ME will have to perform a subsequent registration later to support particular ICSI(s) contained in the UICC. The SIP REGISTER message contains media feature tags containing ICSI(s) along with IARI(s) values. For example, as shown in FIGS. 4 and 5 it would be desirable to provide enhanced support multiple IARI and ICSI values in the REGISTER and INVITE messages.

SUMMARY OF THE INVENTION

In accordance with the present invention, to consolidate the SIP messages as much as possible the ME is made aware of all the IMS applications installed in its memory and on the UICC and supported communication services. By obtaining this information at boot-up time, the ME can save resources by registering all local applications and communication services in single IMS registration.

In various embodiments, there is a plurality of solutions to solve the IARI issue. Also, in various embodiments, the missing ICSI issue is addressed. Also, in certain embodiments, a UICC IMPU solution is set forth. Also, in certain embodiments, the solutions to provide the IMS registration state to the UICC after a successful IMS registration is set forth.

More specifically, in one embodiment, the invention relates to introducing a new ISIM file to indicate the UICC IARIs to a UE. More specifically, in this embodiment the invention relates to introducing a new ISIM file that contains all the IARIs associated with active applications installed on the UICC. The mobile device (such as a ME) reads this file at boot-up and becomes aware of the presence of the IMS applications present on the UICC. In certain variations of this embodiment, if any associated IARI needs to be added or removed at a later time the file is updated and a notification is sent to the device. Upon receipt of these notifications the ME updates its IMS registration using the SIP REGISTER messages to add or remove the associated IARIs.

In another embodiment, the invention relates to introducing a new USIM file to indicate the UICC IARIs to the UE. More specifically, in this embodiment, the invention relates to using a USIM if an ISIM application is not present. In this embodiment, a new USIM file is introduced that contains all the IARIs associated with active applications installed on the UICC. The device reads the USIM file at boot-up and becomes aware of IMS applications that are present on the card. In certain variations of this embodiment, if any associated IARI needs to be added or removed at a later time the file is updated and a notification is sent to the device. Upon receipt of these notifications the ME updates its IMS registration using the SIP REGISTER messages to add or remove the associated IARIs.

In another embodiment, the invention relates to using event download to notify the UICC of incoming data. More specifically, in this embodiment the invention relates to notifying the UICC of any incoming data on any given application identified by the IARI. The UICC registers to an incoming data event on the ME.

In another embodiment, the invention relates to introducing a file in an ISIM or USIM to indicate an ICSI(s) to the UE. More specifically, in this embodiment the invention relates to introducing an ISIM file that contains all the supported communications services identified by ICSI(s). The device reads this file at boot-up and becomes aware of the presence of the IMS communication services to be supported by applications on the UICC. In this embodiment, if the ISIM application is not present then this method uses USIM. Additionally, in variations of this embodiment, the method introduces a USIM file that contains all the supported communications service identified by ICSI(s). The device reads this file at boot-up and becomes aware of the presence of the IMS communication services supported by applications on the UICC. If any associated ICSIs are added or removed at a later time the file is updated and a notification is sent to the device. Upon receipt of these notifications the UE updates its IMS registration using the SIP REGISTER messages to add or remove the associated ICSI(s).

In another embodiment, the invention relates to introducing a file in ISIM or USIM to indicate a UICC's IMPUs to an ME. More specifically, in this embodiment, the invention relates to storing a unique ID on an USIM/ISIM, an IMPU or several IMPUs. In this embodiment, the ME routes the incoming IMS data for the UICC IMPU directly to the card. The IMPU is not necessarily part a current IMPU list stored on the ISIM; the current IMPU list may be part of the implicit registration set and received by the ME during IMS registration.

In another embodiment, the invention relates to indicating to a UICC that the ME has registered with an IMS after an initial 200 OK message. More specifically, in this embodiment, once the ME has successfully registered with the IMS network the ME notifies the UICC when the IMS network is available. In this embodiment, the trigger of the ME to UICC event is the 200 OK that is returned from the network after the SIP REGISTER message.

In another embodiment, the invention relates to indicating to a UICC that a ME has registered with IMS after each notify associated with a registration event package. More specifically, in this embodiment once the ME has successfully registered with the IMS network, the ME notifies the UICC when the IMS network is available. Subsequent registration state changes during an IMS session also result in notifying to the UICC of these events to prevent the UICC of attempting to send data when there is no IMS registration available. The trigger of the ME to UICC event in this case is a SIP NOTIFY message that comes from the IMS network.

In certain variations of this embodiment, the ME to UICC communication may contain a list of Registered IMPUs. In other variations of this embodiment, the list can be filtered according to the list of IMPUs as discussed above. In other variations of this embodiment, the list may contain a list of Registered IARIs and/or a list of Registered ICSIs. In another variation of this embodiment, the list can also be filtered according to the lists provided in an UICC file.

The present invention includes a plurality of benefits such as allowing the ME to have knowledge of all UICC identities at bootup time. The knowledge results in an ability to consolidate all IARIs into a first SIP REGISTER message and reduce unwanted SIP signaling. The invention also allows operators to change the IARIs as necessary if such a change becomes necessary.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
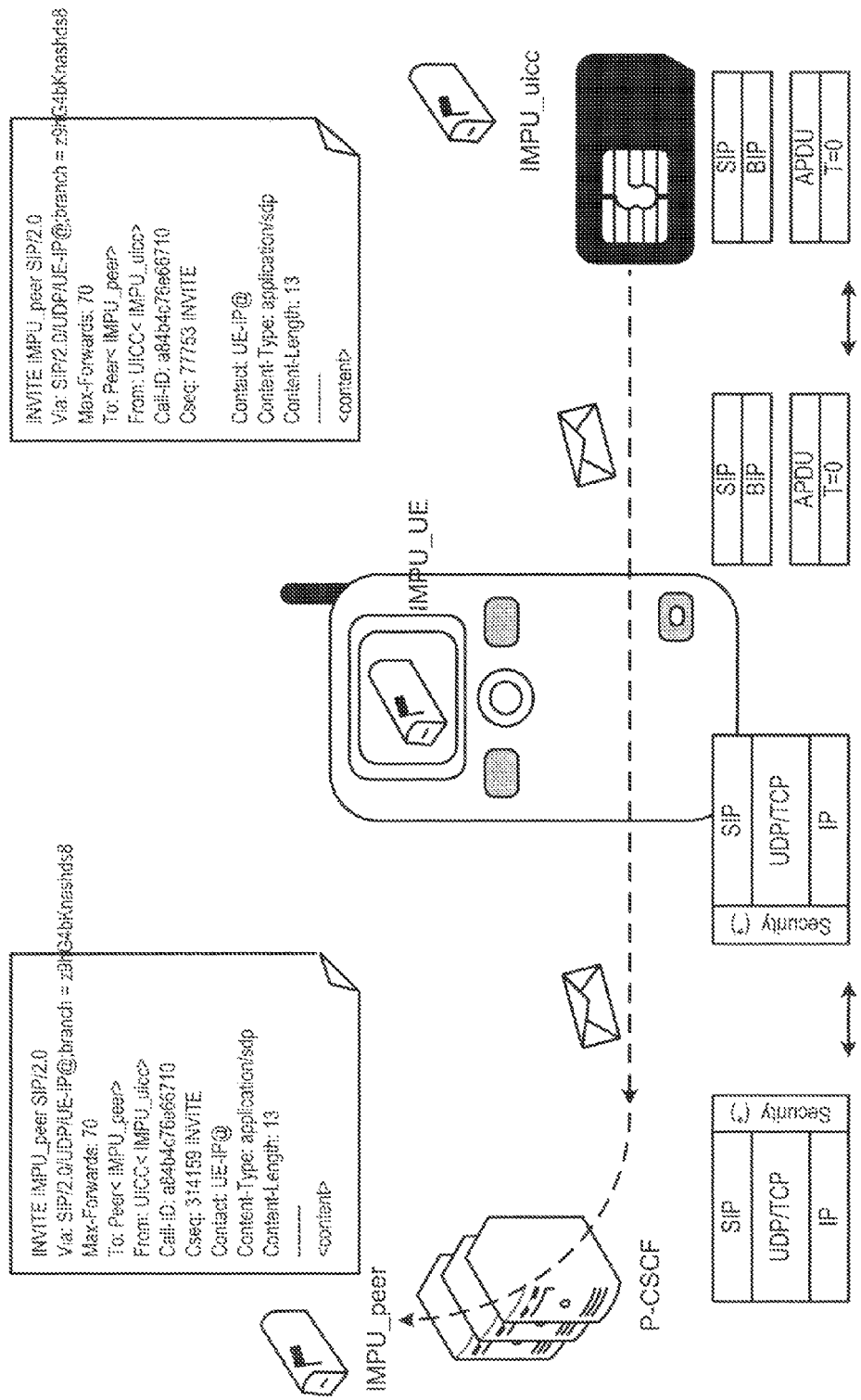
FIG. 1, labeled Prior Art, shows a block diagram of a UICC invite a peer to session operation.
Figure 2:
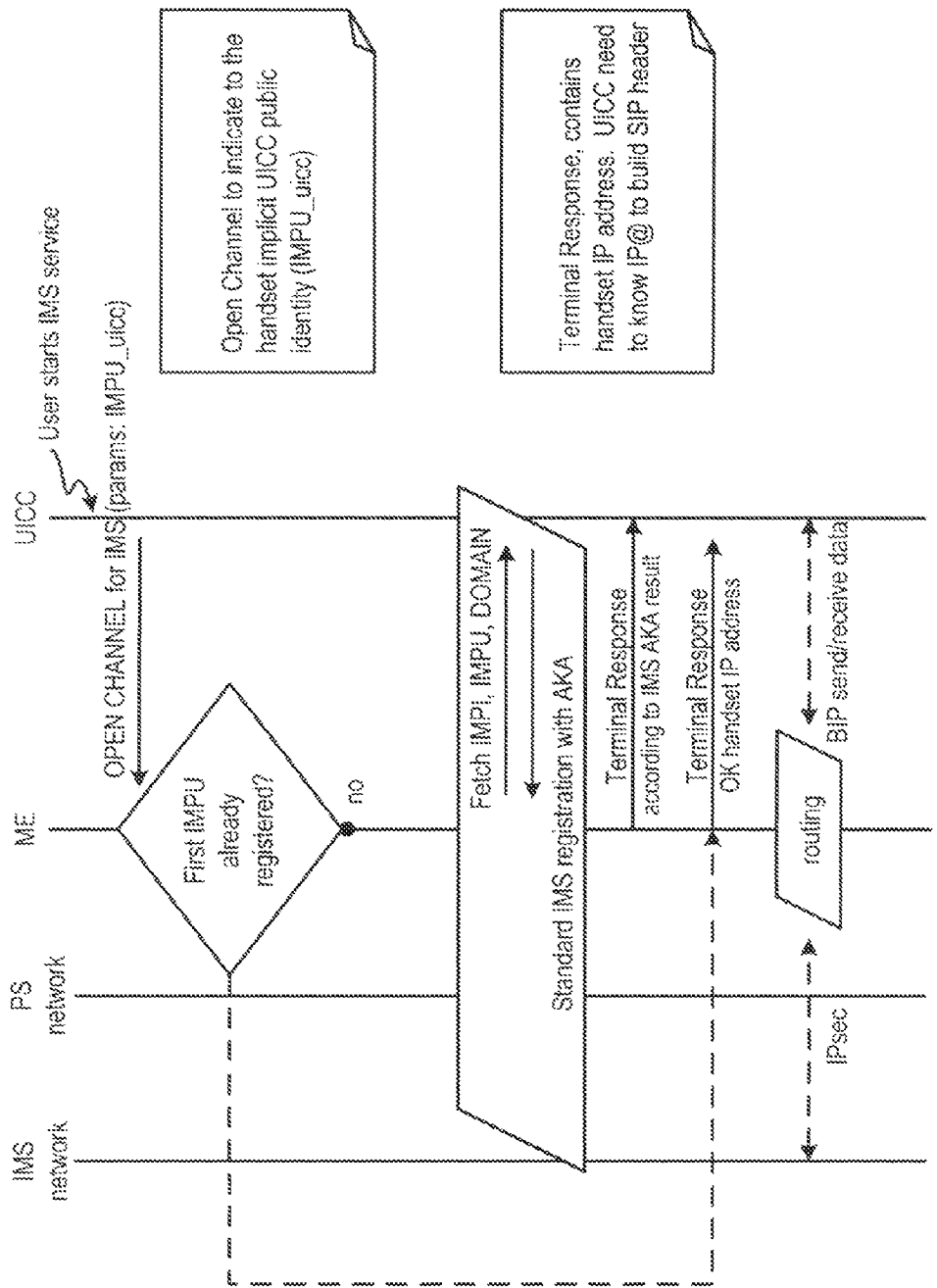
FIG. 2, labeled Prior Art, shows a flow diagram of a UICC to IMS channel establishment operation.
Figure 3:
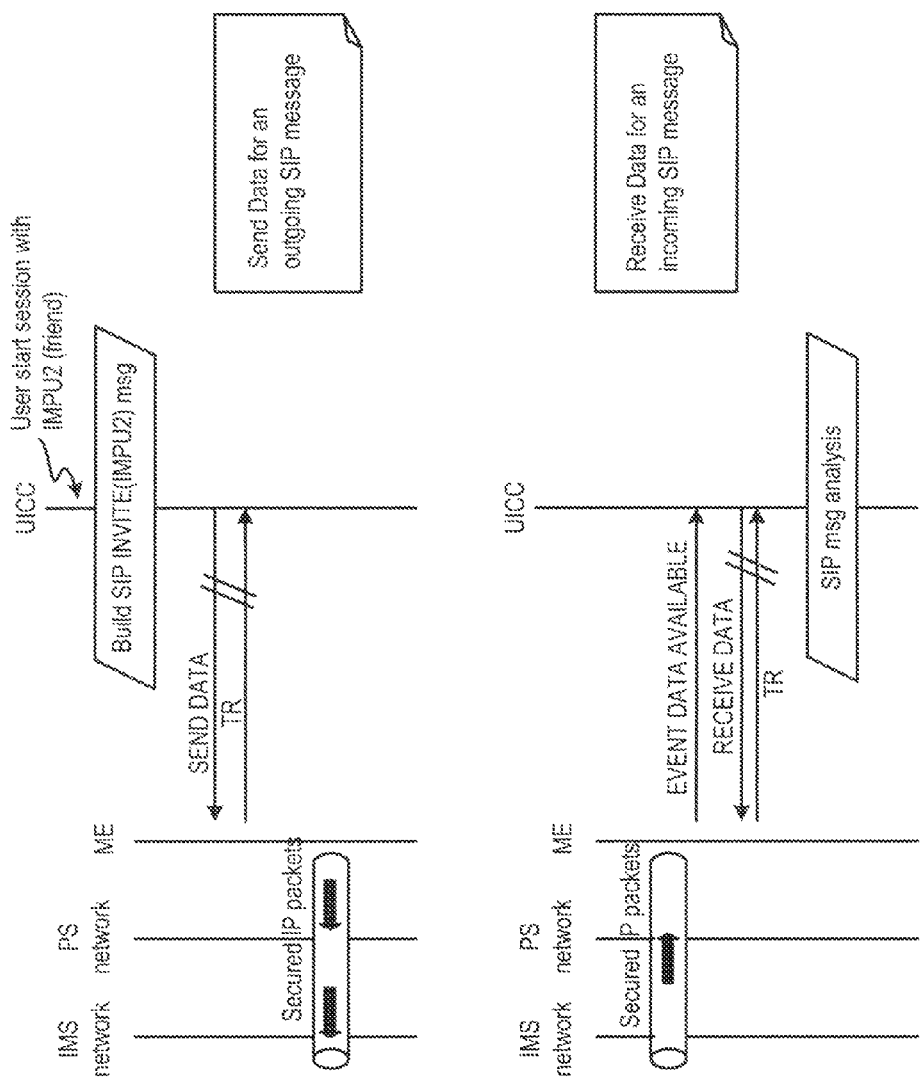
FIG. 3, labeled Prior Art, shows a flow diagram of an IMS data transmission.
Figure 4:
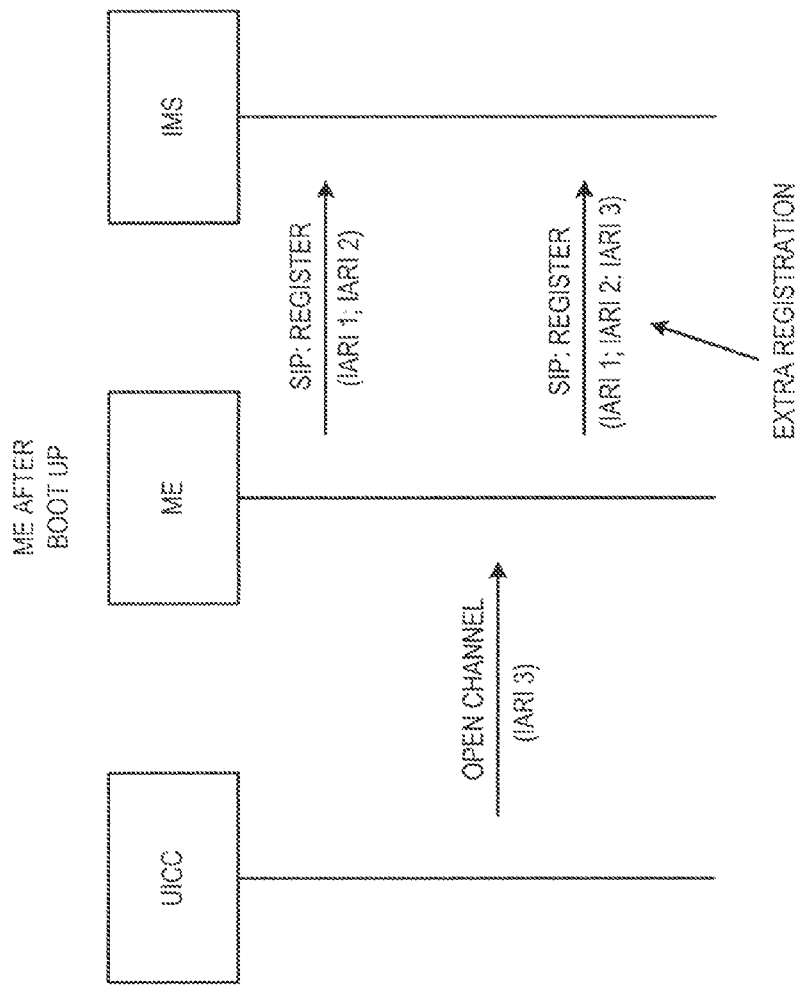
FIG. 4, labeled Prior Art, shows a flow diagram of an example of an extra registration.
Figure 5:
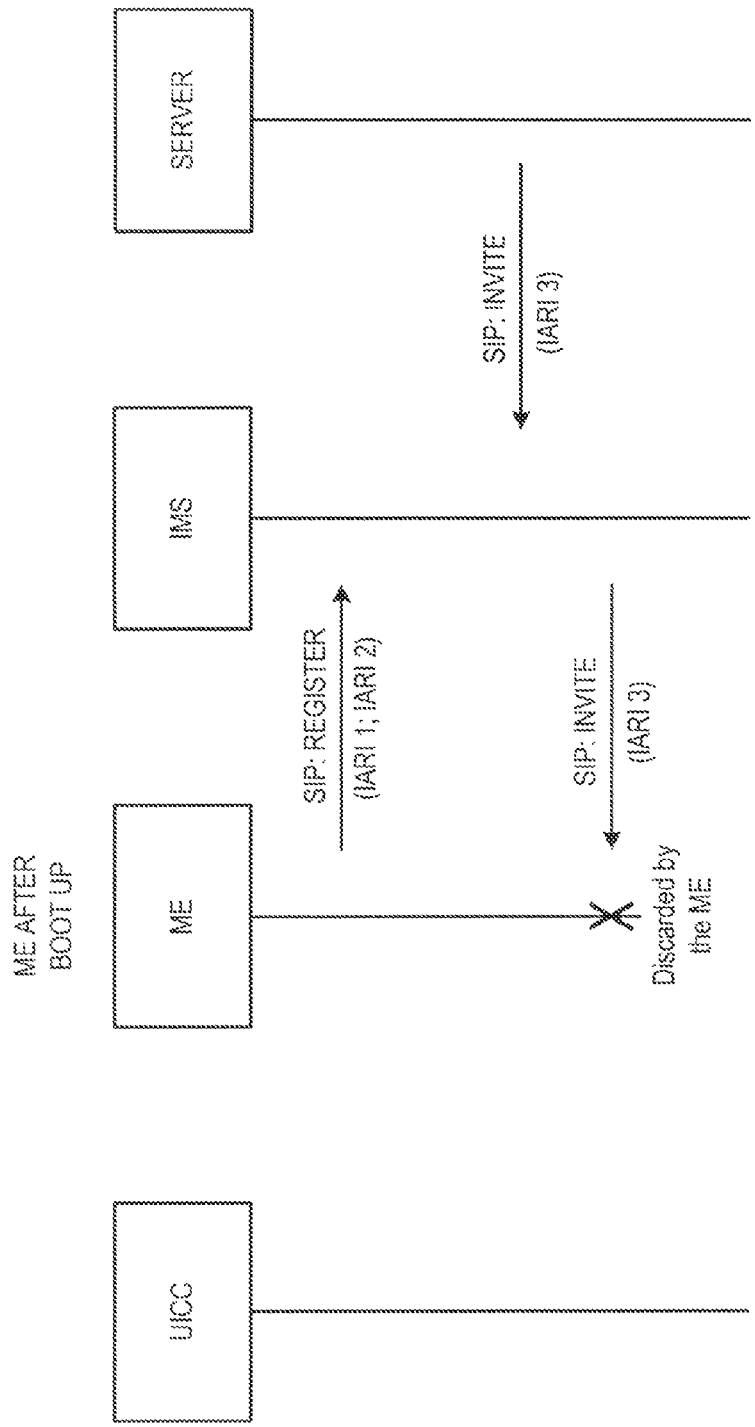
FIG. 5, labeled Prior Art, shows a flow diagram of an example of an unsolicited SIP invite message.
Figure 6:
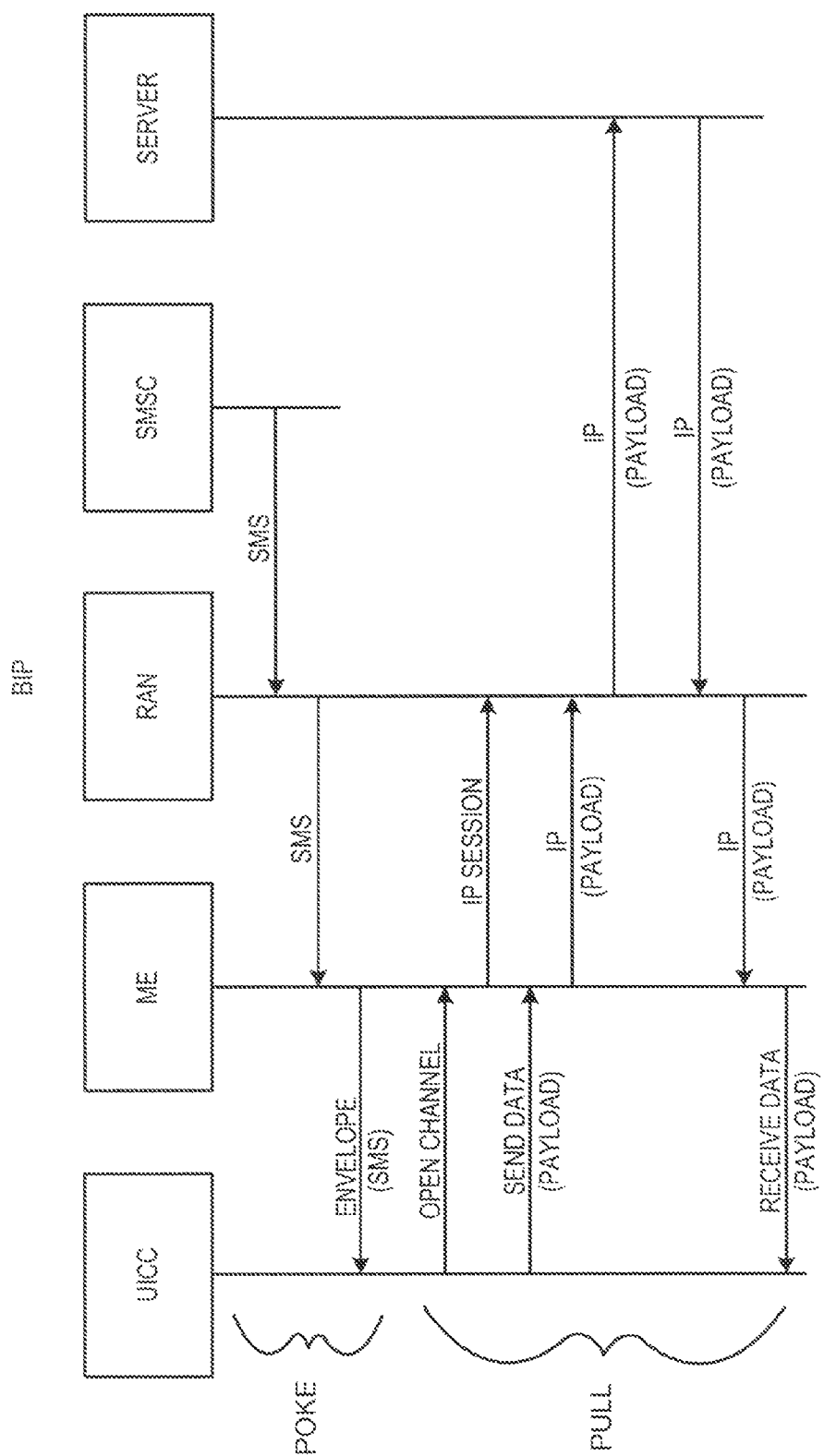
FIG. 6 shows a flow diagram of an example of a poke and pull of a bearer independent protocol.
Figure 7:
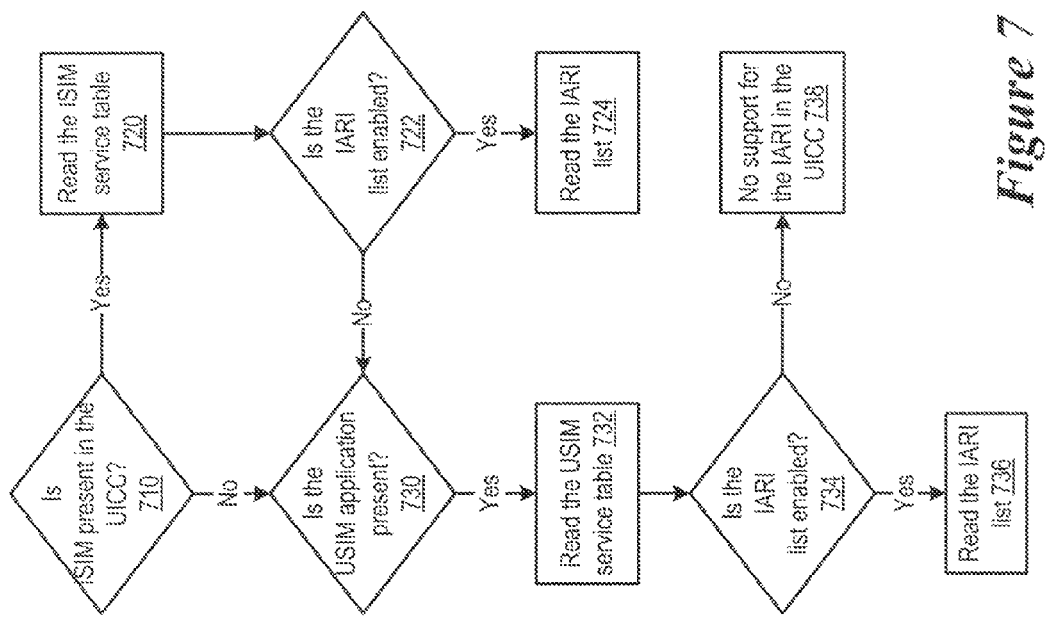
FIG. 7 shows a flow chart of the operation of a ME determining IARI support in a UICC.

Referring to FIG. 7, a flow chart of the operation for a ME to determine IARI support in a UICC is shown. The system includes a mechanism to determine if an IARI is present on the USIM rather than on the ISIM. In certain embodiments, it is possible to have only a USIM application on the UICC.

More specifically, the operation begins by determining if an ISIM is present in the UICC at step 710. If an ISIM is present, then the operation proceeds to read an ISIM service table at step 720. Next, at step 722, the operation determines whether an IARI list is enabled. If the list is enabled, then at step 724, the operation reads the IARI list.

If the ISIM is not present, then the operation proceeds to determine with a USIM application is present at step 730. If a USIM application is present, then the USIM service table is read at step 732. Next, the operation determines whether an IARI list is enabled at step 734. If the IARI list is enabled, then the IARI list is read at step 736. If the IARI list is not enabled, then the operation determines that there is not support for the IARI in the UICC at step 738.

Figure 8:
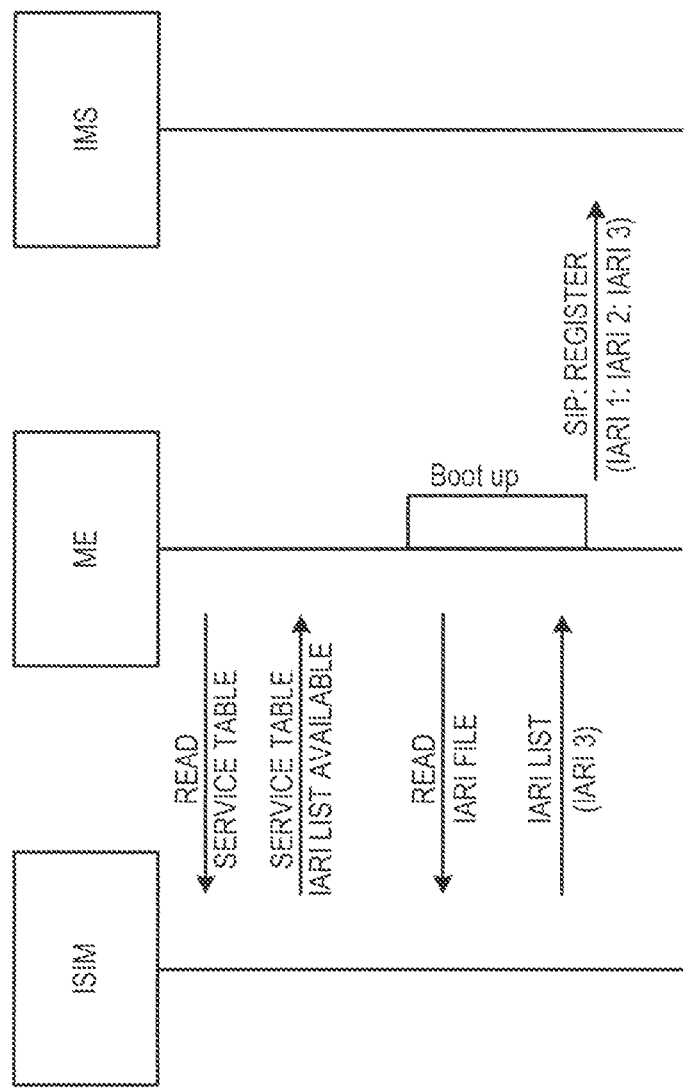
FIG. 8 shows a flow diagram of a message sequence of an ME determining IARI support in a UICC.

Referring to FIG. 8, a flow diagram of a message sequence of an ME determining IARI support in a UICC is shown. More specifically, the ME verifies that an ISIM file is present, Next, the ISIM provides the service table to the ME, which verifies the ISIM service table and look for a particular service (e.g., service XX). Next, the ME reads an IARI file and the ISIM provides an IARI list (IARI3) to the ME. Next, the ME provides the IMS with a session initiation via a SIP REGISTER. An example of an ISIM service table ($EF_{IST}$) is set forth in Table 1.

This elementary File (EF) indicates which optional services are available. If a service is not indicated as available in the ISIM, the ME shall not select the service. In certain embodiments, the presence of this file is mandatory if optional services are provided in the ISIM.

TABLE 1

| Identifier: '6F07' | Structure: transparent | | Optional |
|---|---|---|---|
| SFI: '07' | | | |
| File size: X bytes, X >= 1 | | Update activity: low | |
| Access Conditions: | | | |
| READ | | PIN | |
| UPDATE | | ADM | |
| DEACTIVATE | | ADM | |
| ACTIVATE | | ADM | |
| Bytes | Description | M/O | Length |
| 1 | Services n°1 to n°8 | M | 1 byte |
| 2 | Services n°9 to n°16 | O | 1 byte |
| 3 | Services n°17 to n°24 | O | 1 byte |
| 4 | Services n°25 to n°32 | O | 1 byte |
| etc. | | | |
| X | Services n°(8X − 7) to n°(8X) | O | 1 byte |
| Services Contents: | | | |
| Service n°1: | P-CSCF address | | |
| Service n°2 | Generic Bootstrapping Architecture (GBA) | | |
| Service n°3 | HTTP Digest | | |
| Service n°4 | GBA-based Local Key Establishment Mechanism | | |
| Service n°5 | Support of P-CSCF discovery for IMS Local Break Out | | |
| Service n°X | IARIs associated to active UICC IMS applications | | |

Once the ME determines that the IARI file is available and present (see e.g., step 722 of FIG. 7), the ME uses a select command to read the contents of the IARI list. An example of the IARI list ($EF_{IAAUIA}$) is set forth in Table 2. If the service X (X representing a placeholder value) is available, the IARI file is present. The EF contains a list of active IARIs that need to be registered on the initial IMS registration of the UE. In this embodiment, the structure of the EF is linear fixed while in other embodiments it is transparent.

TABLE 2

| Identifier: '6FXX' | Structure: linear fixed | | Optional |
|---|---|---|---|
| SFI: 'YY' | | | |
| Record length: X bytes; X ≥ 3 | | Update activity: low | |
| Access Conditions: | | | |
| READ | | ALWAYS | |
| UPDATE | | ADM | |
| ACTIVATE | | ADM | |
| DEACTIVATE | | ADM | |
| Bytes | Description | M/O | Length |
| 1 to X | IARI TLV objects | M | X bytes |

IARI TLV objects.
The content and coding (Full name for network and Short name for network) is defined below).
Coding of the Network name TLV objects

| Length | Description | Status |
|---|---|---|
| 1 byte | IARI TLV TAG | M |
| X byte | Length of IARI | M |
| Y bytes | IARI value | M |

IARI value shall be coded as defined in 3GPP TS 24.229.
Unused bytes shall be set to 'FF'.

Figure 9:
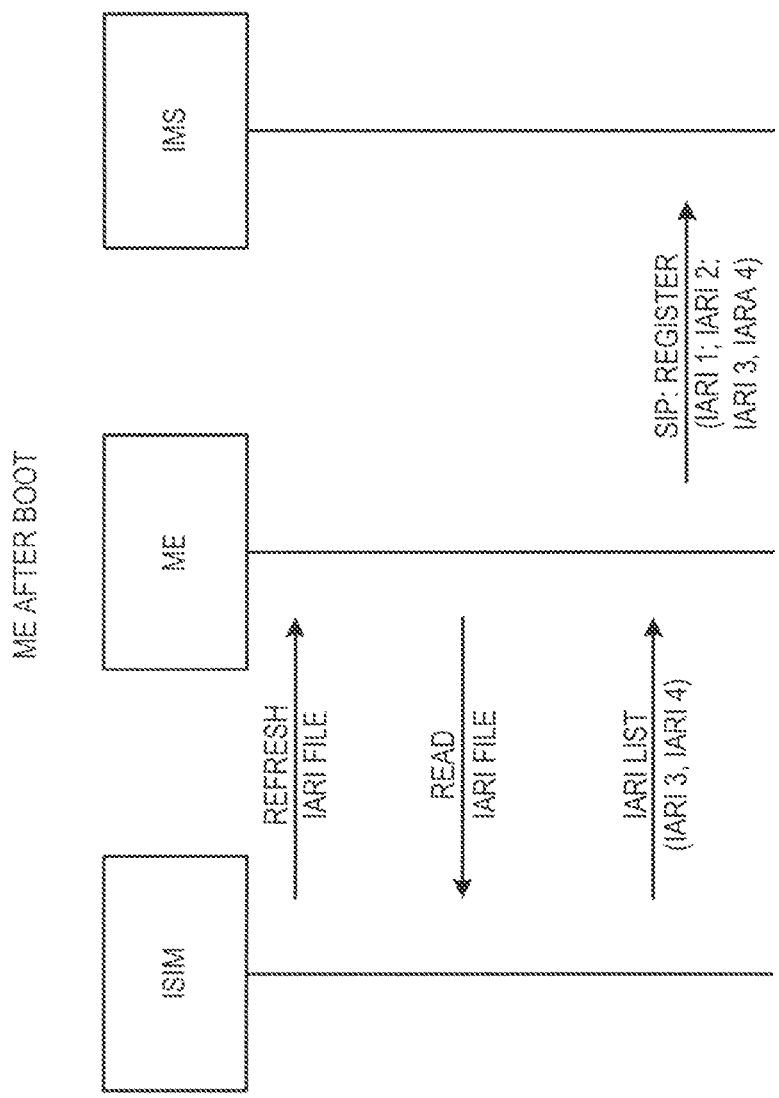
FIG. 9 shows flow diagram of another portion of a message sequence of an ME determining IARI support in a UICC.

Referring to FIG. 9, flow diagram of another portion of a message sequence of an ME determining IARI support in a UICC is shown. More specifically, the ME then includes the IARIs in the SIP REGISTER request pursuant to 3GPP TS 24.229.

In certain embodiments, the UICC may request a deregistration or a new registration of an IARI by sending a file Refresh proactive command on $EF_{IAAUIA}$. More specifically, the Refresh command is set forth in Table 3.

TABLE 3

REFRESH

| Description | Clause | M/O/C | Min | Length |
|---|---|---|---|---|
| Proactive UICC command Tag | 9.2 | M | Y | 1 |
| Length (A + B + C + D + E + F + G + H) | — | M | Y | 1 or 2 |
| Command details | 8.6 | M | Y | A |
| Device identities | 8.7 | M | Y | B |
| File List | 8.18 | C | N | C |
| AID | 8.60 | O | N | D |
| Alpha identifier | 8.2 | O | N | E |
| Icon identifier | 8.31 | O | N | F |
| Text Attribute | 8.72 | C | N | G |
| Frame Identifier | 8.80 | O | N | H |

For the refresh modes "File Change Notification," "NAA Initialization and File Change Notification," and "NAA Session Reset," the UICC supplies a File List data object, indicating which EFs need to be refreshed. For other modes, inclusion of a File List is optional, and the terminal ignores it. In certain embodiments, the refresh request is defined in ETSI TS 102 223.

Figure 10:
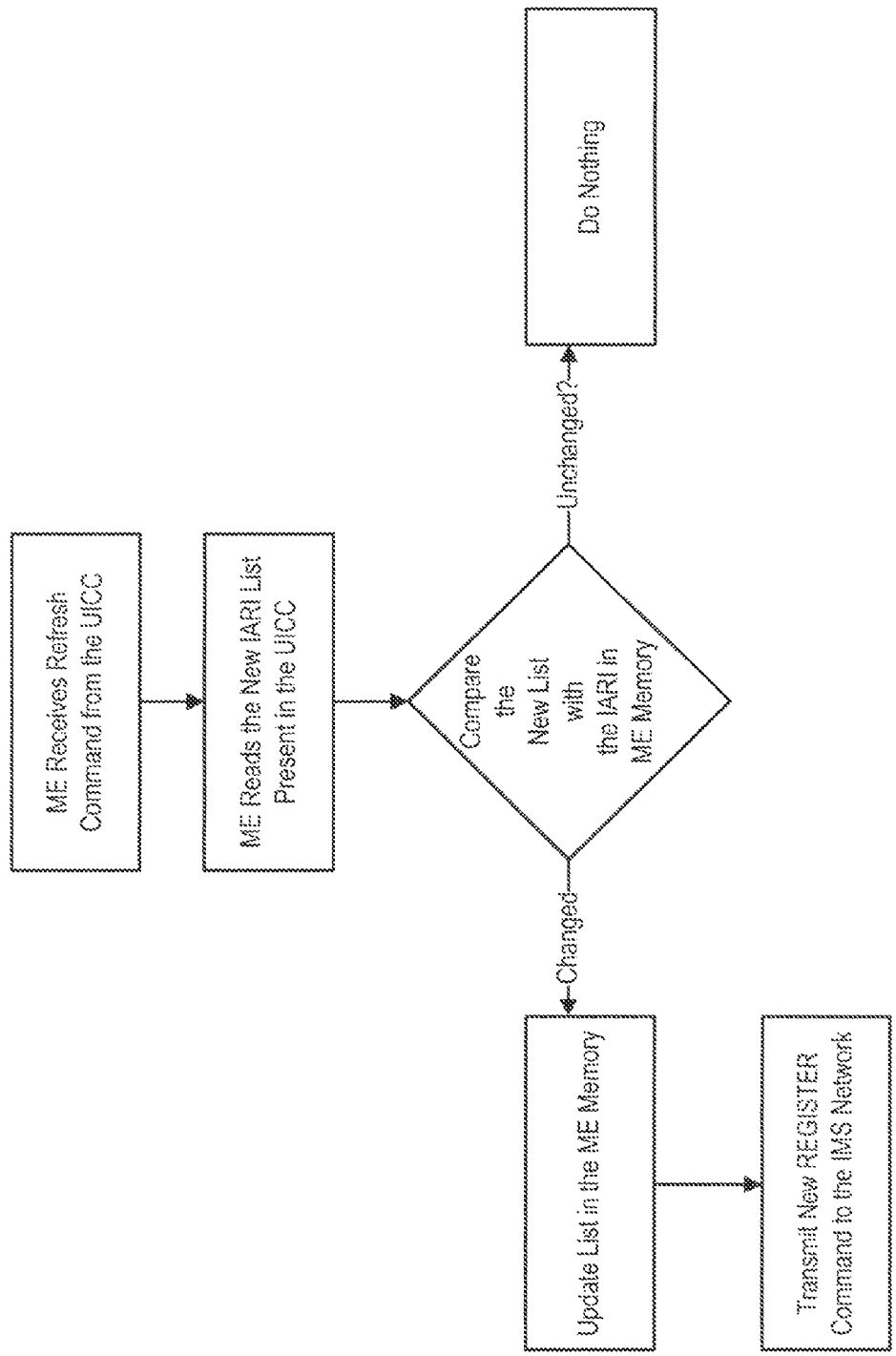
FIG. 10 shows a flow chart of the operation of determining if any supplementary registration is required.

Referring to FIG. 10, a flow chart of the operation of determining if any supplementary registration is required is shown. In certain embodiments, the ME includes IARI management that will detect if any IARIs have been removed and if any have been added. The ME will then re-issue a new registration to IMS to reflect this change.

More specifically, at step 1010, the ME receives a refresh command from the UICC. Next, at step 1020, the ME reads the new IARI list present in the UICC and at step 1022, compares the new list with the IARI list that is stored within the ME memory. If the list is changed, then the ME updates the list in the ME memory at step 1030 and transmits a new SIPREGISTER command to the IMS network at step 1032. If the list is unchanged, then the ME does nothing (step 1040).

Figure 11:
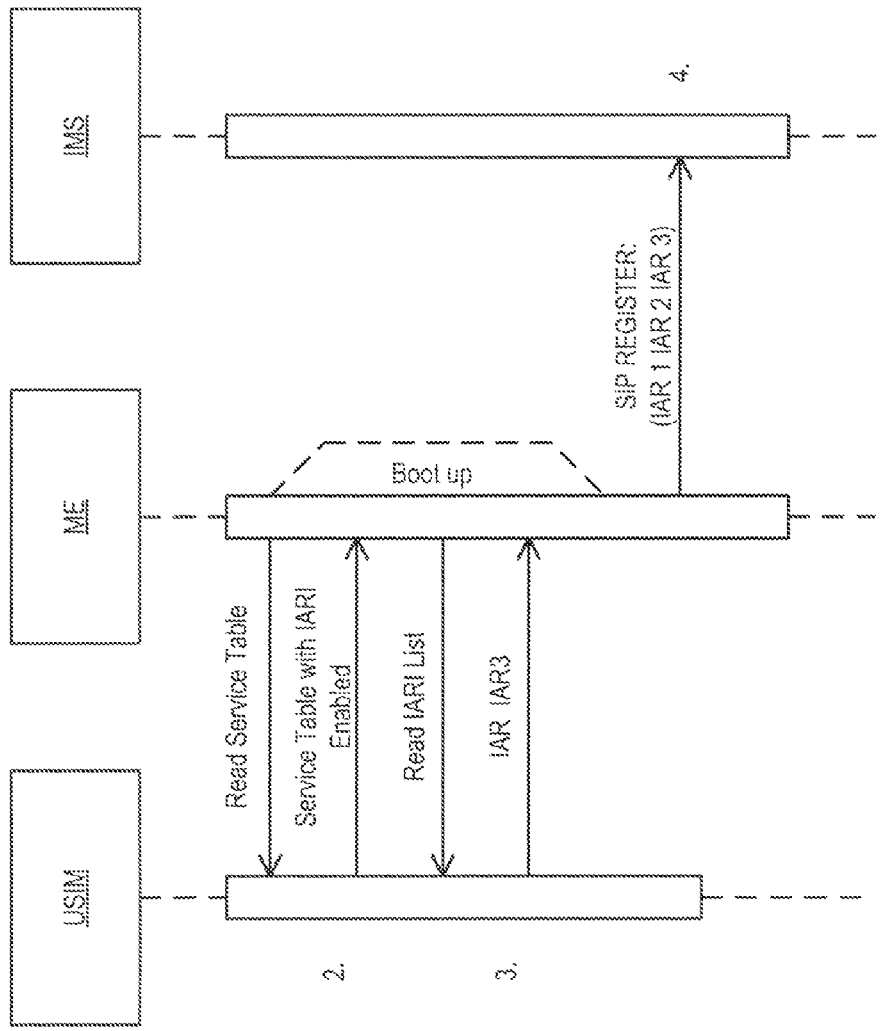
FIG. 11 shows a flow diagram of reading an IARI from a USIM.

Referring to FIG. 11, a flow diagram of an operation of reading an IARI from a USIM is shown. More specifically, if the ME determines that there is no ISIM present (see e.g., step 710 of FIG. 7) or that the ISIM doesn't support the IARI list feature (see e.g., step 722 of FIG. 7), then the ME reads the information from the USIM.

More specifically, first the device determines whether the USIM file is present (see e.g., step 730 of FIG. 7). The ME then verifies the USIM service table and look for service XX (XX representing a placeholder value).

If the service XX is available, the USIM file is present. The EF indicates which services are available. More specifically, the USIM file is set forth as $EF_{UST}$ (USIM Service Table) at Table 4.

TABLE 4

| Identifier: '6F38' | Structure: transparent | Mandatory |
|---|---|---|
| SFI: '04' | | |
| File size: X bytes, (X ≥ 1) | Update activity: low | |

Access Conditions:

| READ | PIN |
|---|---|
| UPDATE | ADM |
| DEACTIVATE | ADM |
| ACTIVATE | ADM |

| Bytes | Description | M/O | Length |
|---|---|---|---|
| 1 | Services n°1 to n°8 | M | 1 byte |
| 2 | Services n°9 to n°16 | O | 1 byte |
| 3 | Services n°17 to n°24 | O | 1 byte |
| 4 | Services n°25 to n°32 | O | 1 byte |
| etc. | | | |
| X | Services n°(8X − 7) to n°(8X) | O | 1 byte |

Services Contents:

| | |
|---|---|
| Service n°1: | Local Phone Book |
| Service n°2: | Fixed Dialling Numbers (FDN) |
| Service n°3: | Extension 2 |
| Service n°4: | Service Dialling Numbers (SDN) |
| Service n°5: | Extension 3 |
| Service n°6: | Barred Dialling Numbers (BDN) |
| Service n°7: | Extension 4 |
| Service n°8: | Outgoing Call Information (OCI and OCT) |
| Service n°9: | Incoming Call Information (ICI and ICT) |
| Service n°10: | Short Message Storage (SMS) |
| Service n°11: | Short Message Status Reports (SMSR) |
| Service n°12: | Short Message Service Parameters (SMSP) |
| Service n°13: | Advice of Charge (AoC) |
| Service n°14: | Capability Configuration Parameters 2 (CCP2) |
| Service n°15: | Cell Broadcast Message Identifier |
| Service n°16: | Cell Broadcast Message Identifier Ranges |
| Service n°17: | Group Identifier Level 1 |
| Service n°18: | Group Identifier Level 2 |
| Service n°19: | Service Provider Name |
| Service n°20: | User controlled PLMN selector with Access Technology |
| Service n°21: | MSISDN |
| Service n°22: | Image (IMG) |
| Service n°23: | Support of Localised Service Areas (SoLSA) |

TABLE 4-continued

| | |
|---|---|
| Service n°24: | Enhanced Multi-Level Precedence and Pre-emption Service |
| Service n°25: | Automatic Answer for eMLPP |
| Service n°26: | RFU |
| Service n°27: | GSM Access |
| Service n°28: | Data download via SMS-PP |
| Service n°29: | Data download via SMS-CB |
| Service n°30: | Call Control by USIM |
| Service n°31: | MO-SMS Control by USIM |
| Service n°32: | RUN AT COMMAND command |
| Service n°33: | shall be set to '1' |
| Service n°34: | Enabled Services Table |
| Service n°35: | APN Control List (ACL) |
| Service n°36: | Depersonalisation Control Keys |
| Service n°37: | Co-operative Network List |
| Service n°38: | GSM security context |
| Service n°39: | CPBCCH Information |
| Service n°40: | Investigation Scan |
| Service n°41: | MexE |
| Service n°42: | Operator controlled PLMN selector with Access Technology |
| Service n°43: | HPLMN selector with Access Technology |
| Service n°44: | Extension 5 |
| Service n°45: | PLMN Network Name |
| Service n°46: | Operator PLMN List |
| Service n°47: | Mailbox Dialling Numbers |
| Service n°48: | Message Waiting Indication Status |
| Service n°49: | Call Forwarding Indication Status |
| Service n°50: | Reserved and shall be ignored |
| Service n°51: | Service Provider Display Information |
| Service n°52: | Multimedia Messaging Service (MMS) |
| Service n°53: | Extension 8 |
| Service n°54: | Call control on GPRS by USIM |
| Service n°55: | MMS User Connectivity Parameters |
| Service n°56: | Network's indication of alerting in the MS (NIA) |
| Service n°57: | VGCS Group Identifier List ($EF_{VGCS}$ and $EF_{VGCSS}$) |
| Service n°58: | VBS Group Identifier List ($EF_{VBS}$ and $EF_{VBSS}$) |
| Service n°59: | Pseudonym |
| Service n°60: | User Controlled PLMN selector for I-WLAN access |
| Service n°61: | Operator Controlled PLMN selector for I-WLAN access |
| Service n°62: | User controlled WSID list |
| Service n°63: | Operator controlled WSID list |
| Service n°64: | VGCS security |
| Service n°65: | VBS security |
| Service n°66: | WLAN Reauthentication Identity |
| Service n°67: | Multimedia Messages Storage |
| Service n°68: | Generic Bootstrapping Architecture (GBA) |
| Service n°69: | MBMS security |
| Service n°70: | Data download via USSD and USSD application mode |
| Service n°71: | Equivalent HPLMN |
| Service n°72: | Additional TERMINAL PROFILE after UICC activation |
| Service n°73: | Equivalent HPLMN Presentation Indication |
| Service n°74: | Last RPLMN Selection Indication |
| Service n°75: | OMA BCAST Smart Card Profile |
| Service n°76: | GBA-based Local Key Establishment Mechanism |
| Service n°77: | Terminal Applications |
| Service n°78: | Service Provider Name Icon |
| Service n°79: | PLMN Network Name Icon |
| Service n°80: | Connectivity Parameters for USIM IP connections |
| Service n°81: | Home I-WLAN Specific Identifier List |
| Service n°82: | I-WLAN Equivalent HPLMN Presentation Indication |
| Service n°83: | I-WLAN HPLMN Priority Indication |
| Service n°84: | I-WLAN Last Registered PLMN |
| Service n°85: | EPS Mobility Management Information |
| Service n°86: | Allowed CSG Lists and corresponding indications |
| Service n°87: | Call control on EPS PDN connection by USIM |
| Service n°88: | HPLMN Direct Access |
| Service n°89: | eCall Data |
| Service n°90: | Operator CSG Lists and corresponding indications |
| Service n°XX: | IARIs associated to active UICC IMS applications |

The $EF_{UST}$ contains at least one byte. Further bytes may be included, but if the $EF_{UST}$ includes an optional byte, then the EF will also contain all bytes before that byte. Other services are possible in the future and may be coded on further bytes in the $EF_{UST}$. The coding falls under the responsibility of the 3GPP.

Figure 12:
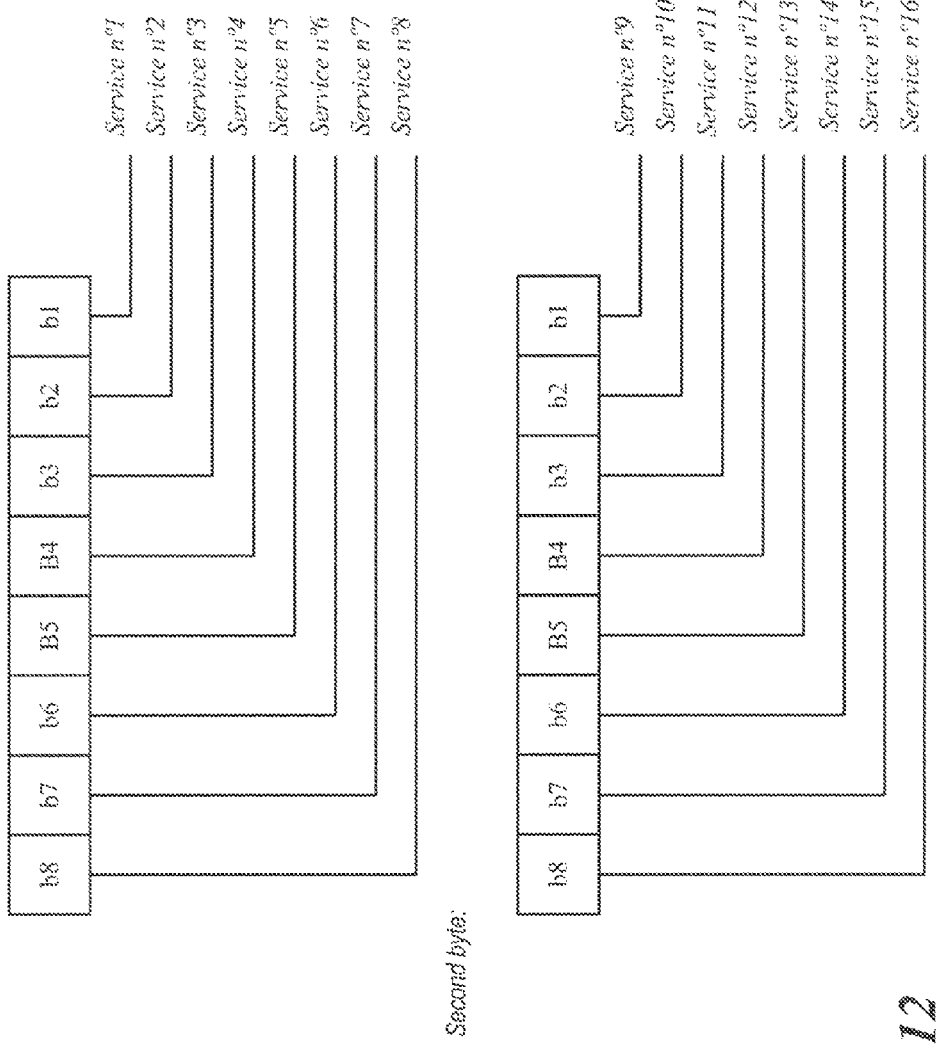
FIG. 12 shows a mapping of a plurality of bytes of an elementary file.

More specifically, FIG. 12 shows a mapping of a plurality of bytes of the $EF_{UST}$. In this mapping, on bit is used for each service where a 1 indicates a service is available and a 0 indicates a service is not available. When a service is available the USIM has the capability to support the service and the service is available for the user of the USIM unless the service is identified as disabled in the file $EF_{EST}$. When a service not available the service is not to be used by the USIM user, even if the USIM has the capability to support the service. More specifically, $EF_{EST}$ is set forth in Table 5. The file $EF_{EST}$ is present when a service n 2, 6 or 35 is available as indicated within a USIM service table. The file $EF_{EST}$ indicates which services are enabled. If a service is not indicated as enabled the file $EF_{EST}$, the ME does not select the service. In another embodiment, for an ISIM environment, an $EF_{IEST}$ file may be used.

TABLE 5

| Identifier: '6F56' SFI: '05' | Structure: transparent | Optional |
|---|---|---|
| File size: X bytes, (X ≥ 1) | | Update activity: low |

| Access Conditions: | |
|---|---|
| READ | PIN |
| UPDATE | PIN2 |
| DEACTIVATE | ADM |
| ACTIVATE | ADM |

| Bytes | Description | M/O | Length |
|---|---|---|---|
| 1 | Services n°1 to n°8 | M | 1 byte |
| 2 | Services n°9 to n°16 | O | 1 byte |
| etc. | | | |
| X | Services n°(8X − 7) to n°(8X) | O | 1 byte |

| Services Contents: | |
|---|---|
| Service n°1: | Fixed Dialling Numbers (FDN) |
| Service n°2: | Barred Dialling Numbers (BDN) |
| Service n°3: | APN Control List (ACL) |

The EF contains at least one byte. Further bytes may be included, but if the EF includes an optional byte, then the EF also contains all bytes before that byte. Other services are possible. The coding falls under the responsibility of the 3GPP. Mores specifically, with the coding, one bit is used to code each service where a 1 indicates that a service is activated and a 0 indicates that a service is deactivated. All unused bits are set to 0. A service which is listed in the is enabled if it is indicated as available in the USIM service table and indicated as activated in the enabled services table.

Once the ME has determined that the file is available and present, the ME uses the select command to read the contents of the file $EF_{IAAUIA}$. The file $EF_{IAAUIA}$ contains a list of active IARIs that need to be registered on an initial IMS registration of a UE. The file $EF_{IAAUIA}$ is set forth in Table 6.

TABLE 6

| Identifier: '6FXX' SFI: 'YY' | Structure: linear fixed | Optional |
|---|---|---|
| Record length: X bytes; X ≥ 3 | | Update activity: low |

| Access Conditions: | |
|---|---|
| READ | ALWAYS |
| UPDATE | ADM |
| ACTIVATE | ADM |
| DEACTIVATE | ADM |

| Bytes | Description | M/O | Length |
|---|---|---|---|
| 1 to X | IARI TLV objects | M | X bytes |

Where the content and coding of IARI TLV objects (Full name for network and Short name for network) is defined as:
Coding of the Network name TLV objects

| Length | Description | Status |
|---|---|---|
| 1 byte | IARI TLV TAG | M |
| X byte | Length of IARI | M |
| Y bytes | IARI value | M |

The ME then includes the IARIs in a SIP REGISTER request pursuant to 3GPP TS 24.229. In certain embodiments, if a linear fixed structure is used then the unused bits are set to FF.

Figure 13:
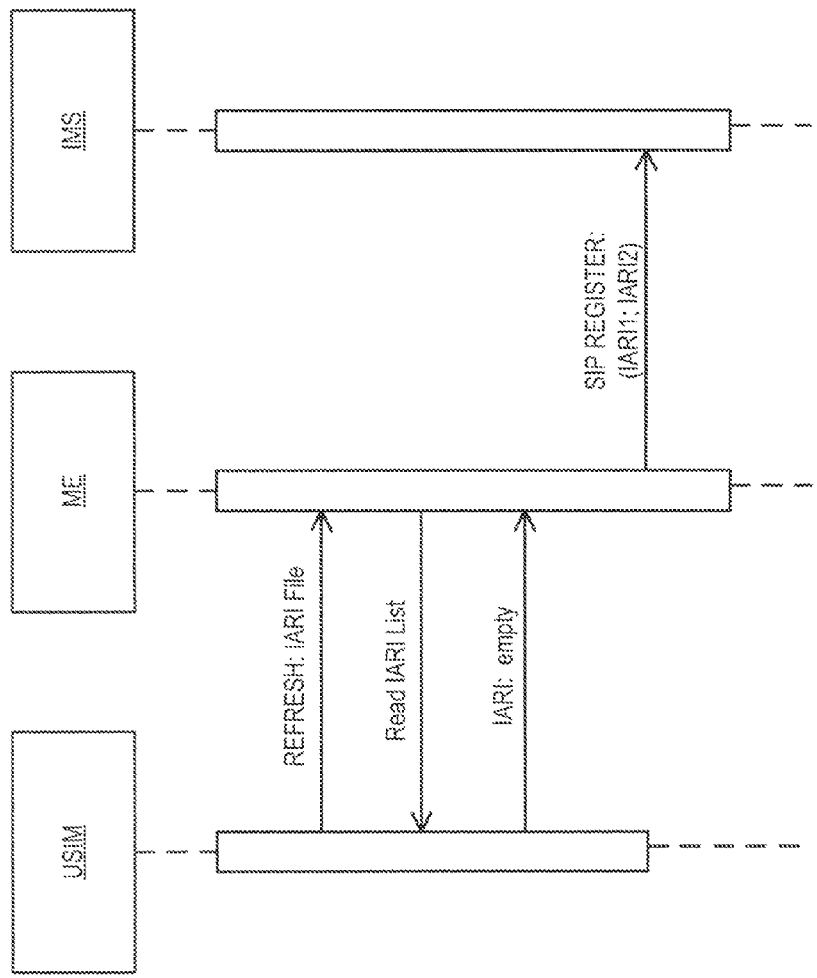
FIG. 13 shows a flow diagram of a UICC removing an IARI from a list to deregister the IARI.

Referring to FIG. 13, a flow diagram of a UICC removing an IARI from a list to deregister the IARI. In certain embodiments, the UICC may request a deregistration or a new registration of an IARI by sending a file Refresh proactive command on $EF_{IAAUIA}$. More specifically the Refresh command is set forth in Table 7.

TABLE 7

| REFRESH | | | | |
|---|---|---|---|---|
| Description | Clause | M/O/C | Min | Length |
| Proactive UICC command Tag | 9.2 | M | Y | 1 |
| Length | — | M | Y | 1 or 2 |
| (A + B + C + D + E + F + G + H) | | | | |
| Command details | 8.6 | M | Y | A |
| Device identities | 8.7 | M | Y | B |
| File List | 8.18 | C | N | C |
| AID | 8.60 | O | N | D |
| Alpha identifier | 8.2 | O | N | E |
| Icon identifier | 8.31 | O | N | F |
| Text Attribute | 8.72 | C | N | G |
| Frame Identifier | 8.80 | O | N | H |

For the refresh modes "File Change Notification," "NAA Initialization and File Change Notification," and "NAA Session Reset," the UICC supplies a File List data object, indicating which EFs need to be refreshed. For other modes, inclusion of a File List is optional, and the terminal ignores it.

In certain embodiments, the ME includes IARI management that will detect if any IARIs have been removed and if any have been added. The ME will then re-issue a new registration using the SIP REGISTER message to IMS to reflect this change.

Figure 14:
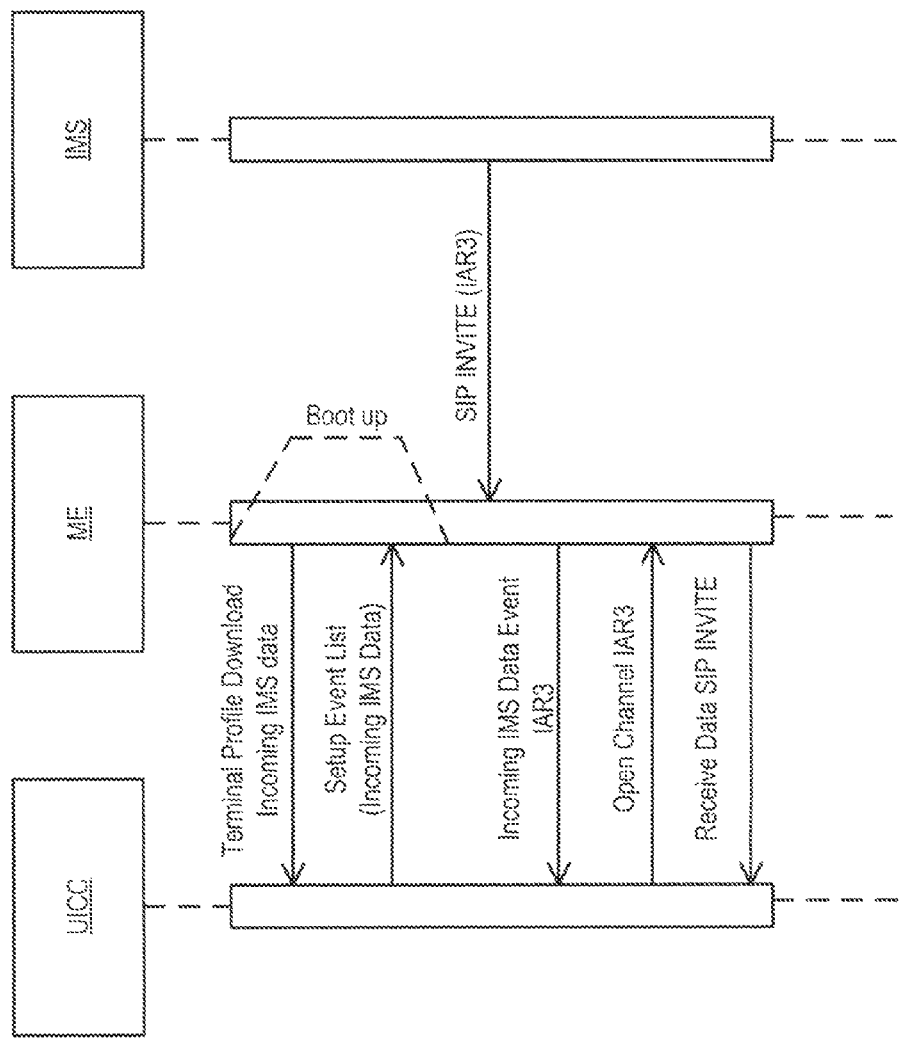
FIG. 14 shows a flow diagram of establishing an appropriate event download for a push IMS.

Referring to FIG. 14, a flow diagram of establishing an appropriate event download for a push IMS is shown. In certain embodiments, the method uses an event download operation to notify the UICC of incoming data. In this embodiment, the UICC verifies the terminal profile for the ME support of the event.

Figure 15:
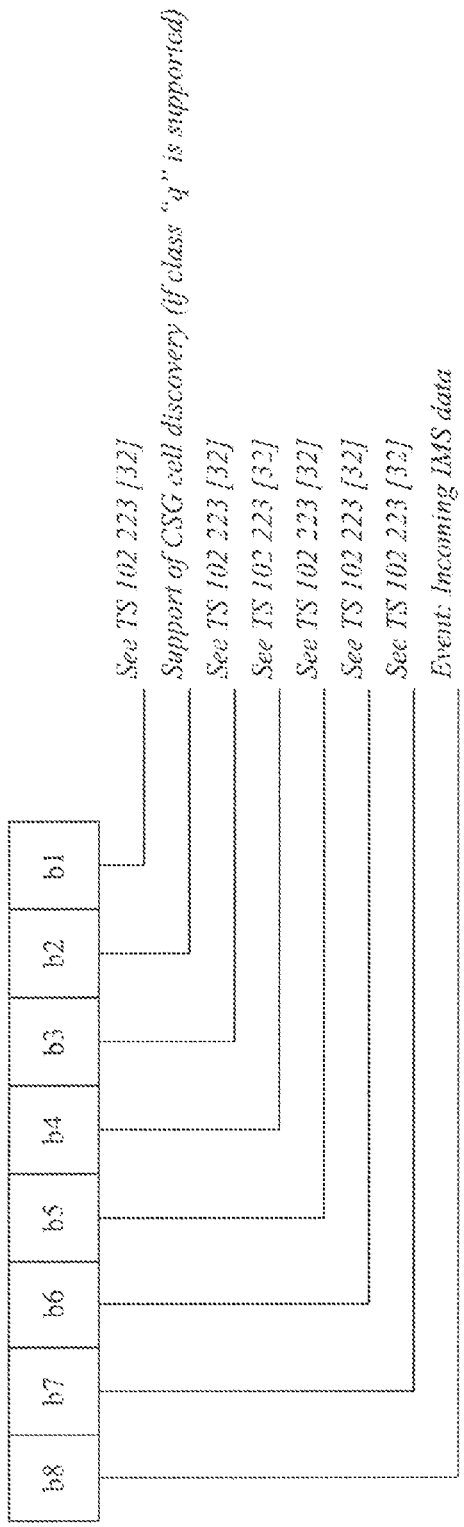
FIG. 15 shows a mapping of a feature in the USAT Terminal Profile

The UICC registers the Event Download command so as to be notified of any incoming data request for the UICC application associated with the IARI or IARIs. If the feature is supported in any radio technology, the UICC proceeds with registering the Incoming IMS data event via a set up event list USAT command. The mapping of the thirty first byte of the UICC is shown in FIG. 15.

More specifically, with the set up event list USAT command, the UICC uses this command to supply a set of events. This set of events becomes the current list of events for which the terminal is to monitor. Any subsequent set up event list command replaces the current list of events supplied in a previous set up event list command. The set up event list command can also be used to remove an entire list of events. The set up event list command can also be used to remove an entire list of events current in the terminal. The list of events provided by the UICC in the last set up event list command will be removed if the terminal is powered off or the UICC is removed or a reset is performed. When the terminal has successfully accepted or removed the list of events, the terminals sends a terminal response command performed successfully to the UICC. When the terminal is not able to successfully accept or remove the list of events, the terminal sends a terminal response of command beyond terminal's capabilities. When one of the events in the current list occurs, then the terminal uses an ENVELOPE (EVENT DOWNLOAD-Incoming IMS data) mechanism to transfer details of the event to the UICC.

For the event list byte coding, a plurality of values are defined in addition to those defined for 3GPP within TS 31.111. More specifically, the values can further include a byte value of 11 for an I-WLAN access status event, a value of 12 for a network rejection event, a value of 15 for a CSG cell selection event and a placeholder value of 1x for incoming IMS data event where each event would receive a new value.

If the UICC doesn't have its IMS channel opened with the ME, the ME buffers the incoming data and uses the envelope command to inform the UICC that it has incoming IMS to UICC transmissions. In certain embodiments the envelope can contain one or more IARIs, in other embodiments the envelope provides a reference to the IARI values stored in the USIM or ISIM to reduce the size of the envelope command.

More specifically, with respect to an incoming IMS data event, if the incoming IMS data event is part of a current event list (as set up by the last set up event list command) then in the case of an incoming IMS message to an active UICC application's associated IARI the terminal informs the UICC that this event has occurred by using an envelope (event download incoming IMS data) command. The direction of the command is ME to UICC and the command header is specified in 3GPP TS 31.111. Additionally, the structure of the envelope (event download incoming IMS data) command is defined as set forth in Table 8.

Direction: ME to UICC.
Command parameters/data.

| Description | Clause | M/O | Min | Length |
|---|---|---|---|---|
| Event download tag | 9.1 | M | Y | 1 |
| Length (A + B + (C or D or I) + E + F + G + H) + J | — | M | Y | 1 |
| Event list | 8.25 | M | Y | A |

-continued

| Description | Clause | M/O | Min | Length |
|---|---|---|---|---|
| Device identities | 8.7 | M | Y | B |
| IARI List | 8.9X | M | Y | G |

Event list: the Event list data object shall contain only one event (value part of length 1 byte), and terminal shall set the event to:
Incoming IMS Data event.
Device identities: the terminal shall set the device identities to:
source: Network;
destination: UICC.
IARI: This data object contains the IARI to which the incoming data is the destination in the UICC.
Response parameters/data: None for this type of ENVELOPE command.

Additionally, the IARI list is set forth in Table 8.

TABLE 8

| Byte(s) | Description | Length |
|---|---|---|
| 1 | IARI Tag | 1 |
| 2 | Length | X |
| 3 | IARI value | X |

Contents:
The UICC IARI set it in the destination field read by the ME.
Coding:
IARI value shall be coded as defined in 24.229.

Finally, the UICC sets up a channel with the appropriate IARI identifier and the ME begins relaying all IMS traffic using this channel.

In certain embodiments, a new file is introduced in an ISIM or USIM to indicate the ICSI(s) to the ME. With this embodiment, the operation allows the ME to know about the associated services (ICSI(s)) supported by the applications on the UICC using the ISIM or USIM. The operation is similar to the operations discussed above with certain exceptions.

For example, in this embodiment the device verifies that the file is present, it will verify the ISIM service table ($EF_{IST}$) and look for service YY (where YY is a placeholder value) if ISIM is present and the application on the UICC supports the communications services identified by the ICSI. If ISIM is not present or does not support the ICSI and a USIM is available then the device verifies the USIM service table ($EF_{UST}$) and looks for service YY where:

Service n°YY UICC ICSI

Once the device has determined that the file is available and present, the device uses the select command to read the contents of the file $EF_{UICCICSI}$.

The device then includes the ICSI(s) in a REGISTER request as defined by 3GPP TS 24.229.

In certain embodiments, a new file is introduced in an ISIM or USIM to indicate an IMPU of a UICC to the ME. With this embodiment, the operation allows ME to know about the subscribed IMPUs through ISIM or USIM. The operation is similar to operation discussed above with certain exceptions.

For example, in this embodiment, the device verifies that the file is present, it will verify the ISIM service table ($EF_{IST}$) and look for service ZZ (where ZZ is a placeholder value) if ISIM is present. If ISIM is not present and a USIM is available then the device verifies the USIM service table ($EF_{UST}$) and look for service ZZ where:

Service n°ZZ UICC IMPUs

Once the device has determined that the file is available and present the device uses the select command to read the contents of $EF_{UICCIMPU}$.

The device then registers (if necessary) one by one the IMPUs that are not registered as part of the implicit registration previously sent to the ME.

Certain embodiments further include a feature of indicating to the UICC that the ME has registered successfully with IMS after an initial 200 OK message. (A 200 OK message is a standard response for successful SIP requests.) Once the ME has successfully registered with the IMS network, the ME indicates to the UICC that the registration was successful. In certain embodiments, the ME can provide the UICC the list IMS registered IMPUs (or filtered according to the list found in the ISIM (EF_IMPU)). In other embodiments, the ME indicates that the registration was successful.

Figure 16:
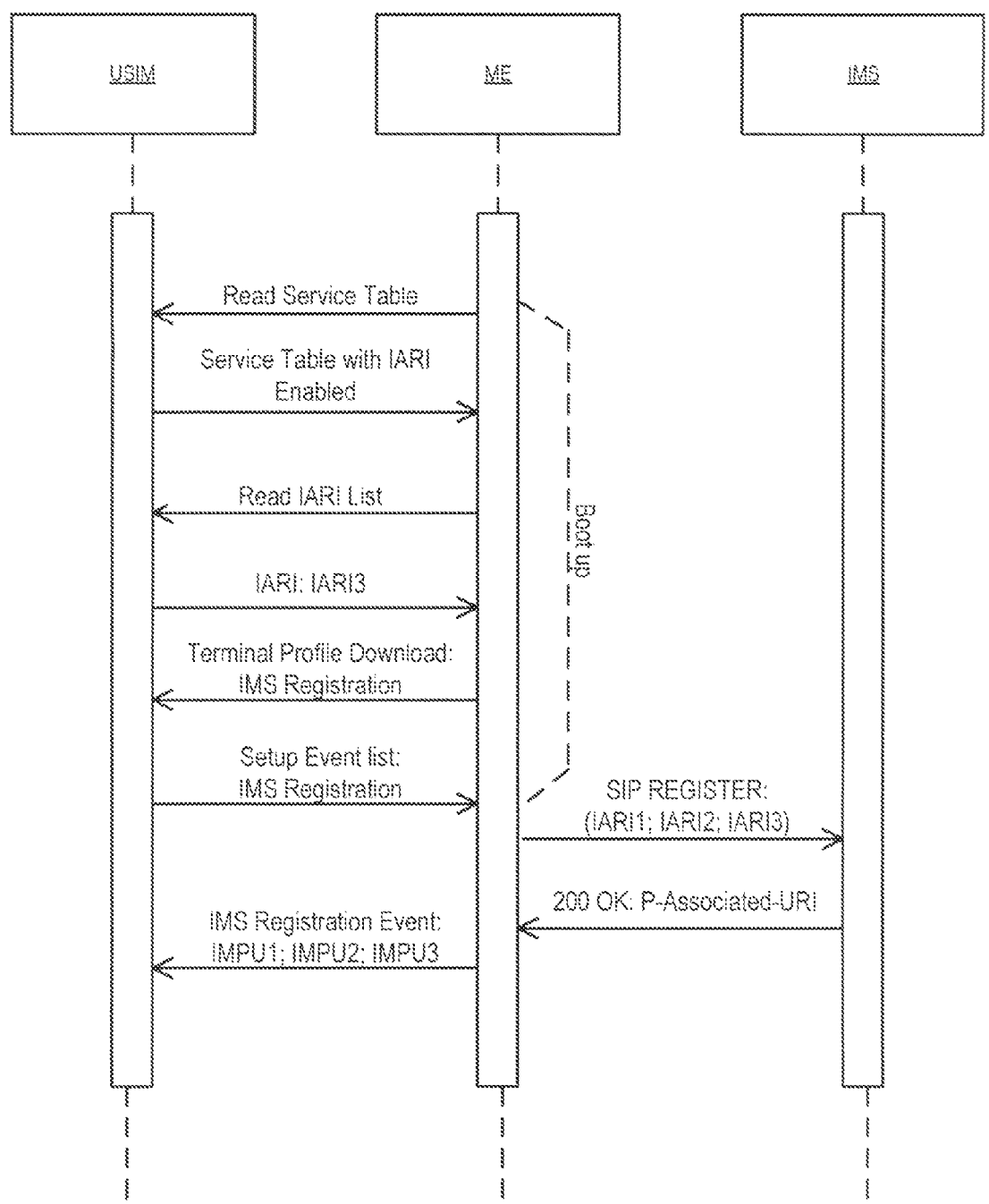
FIG. 16 shows a flow diagram of a UICC receiving an IMS registration event.

More specifically, referring to FIG. 16, a flow diagram of a UICC receiving an IMS registration event is shown. To begin receiving IMS registration events, the UICC will verify the terminal profile for the ME support of this event. The mapping of the thirty first byte of the UICC is shown in FIG. 15. The UICC registers the IMS registration event with the ME via a set up event list command.

More specifically, with the set up event list USAT command, the UICC uses this command to supply a set of events. This set of events becomes the current list of events for which the terminal is to monitor. Any subsequent set up event list command replaces the current list of events supplied in a previous set up event list command. The set up event list command can also be used to remove an entire list of events. The set up event list command can also be used to remove an entire list of events current in the terminal. The list of events provided by the UICC in the last set up event list command will be removed if the terminal is powered off or the UICC is removed or a reset is performed. When the terminal has successfully accepted or removed the list of events, the terminals sends a terminal response okay to the UICC. When the terminal is not able to successfully accept or remove the list of events, the terminal sends a terminal response of command beyond terminal's capabilities. When one of the events in the current list occurs, then the terminal uses an event download mechanism to transfer details of the event to the UICC.

For the event list byte coding, a plurality of values are defined in addition to those defined for 3GPP within TS 31.111. More specifically, the values can further include a byte value of 11 for an I-WLAN access status event, a value of 12 for a network rejection event, a value of 15 for a closed subscriber group (CSG) cell selection event and a placeholder value of 1y for IMS registration event where each event would receive a new value.

The ME then includes the IARIs of the supported applications on the UICC in the REGISTER request pursuant to 3GPP TS 24.229. The ME receives a 200 OK that contains the Private header associated uniform resource indicator (P-Associated-URI) list. A P-Associated-URI list allows a registrar to return a set of associated URIs for a register address of record.

The ME sends the IMS registration notification to the UICC containing the list of IMPUs based on the IMPUs included in the P-Associated-URI.

If the IMS Registration event is part of the current event list (as set up by the last set up event list command, then, upon receiving a 200 OK after a REGISTER SIP message, the terminal informs the UICC that this event has occurred, by using the ENVELOPE (EVENT DOWNLOAD-IMS Registration) command. The direction of the command is ME to UICC and the command header could be specified in 3GPP TS 31.111. Additionally, the structure of the ENVELOPE (EVENT DOWNLOAD-IMS Registration) command is set forth in Table 9.

Command parameters/data.

TABLE 9

| Description | Clause | M/O | Min | Length |
| --- | --- | --- | --- | --- |
| Event download tag | 9.1 | M | Y | 1 |
| Length (A + B + (C or D or I) + E + F + G + H) + J | — | M | Y | 1 |
| Event list | 8.25 | M | Y | A |
| Device identities | 8.7 | M | Y | B |
| IMPU lists | 8.9X | M | Y | G |

Event list: the Event list data object contains only one event (value part of length 1 byte), and terminal sets the event to:
IMS Registration Event.
Device identities: the terminal shall set the device identities to:
source: Network;
destination: UICC.
IMPU: This data object shall contain the list of IMPUs received in the 200 OK message in the P-Associated-URI header.
Response parameters/data: None for this type of ENVELOPE command.

Additionally, the registered IMPUs are set forth in Table 10.

TABLE 10

| Byte(s) | Description | Length |
| --- | --- | --- |
| 1 | IMPU List Tag | 1 |
| 2 | Length | X |
| 3 | IMPU tag | Y |
| 4 | IMPU length | Z |
| .. | : | ... |
| ... | ... | ... |

Contents:
List of all the IMPUs received in the 200 OK message following the SIP REGISTER message.
Coding:
IMPU values are coded as defined in 3GPP TS 24.229.

Certain embodiments further include a feature of indicating to the UICC that the ME has registered with IMS after each notify indication. Once the ME has successfully registered with the IMS network, the ME indicates to the UICC that the registration was successful. In certain embodiments, the ME can give the UICC all IMPUs that have been registered. In other embodiment, the ME indicates that the registration was successful.

The UICC will verify the terminal profile for the ME support of this event. The mapping of one of the bytes of the terminal profile of the UICC is shown in FIG. 15. With respect to this mapping, each new service is accorded a corresponding bit such as an incoming data bit or an IMS registration bit. In other embodiments, a service may be accorded both an incoming data bit and an IMS registration bit.

The UICC registers the IMS registration event with the ME via a set up event list command.

More specifically, with the set up event list USAT command, the UICC uses this command to supply a set of events. This set of events becomes the current list of events for which the terminal is to monitor. Any subsequent set up event list command replaces the current list of events supplied in a previous set up event list command. The set up event list command can also be used to remove an entire list of events. The set up event list command can also be used to remove an entire list of events current in the terminal. The list of events provided by the UICC in the last set up event list command will be removed if the terminal is powered off or the UICC is removed or a reset is performed. When the terminal has successfully accepted or removed the list of events, the terminals sends a terminal response okay to the UICC. When the terminal is not able to successfully accept or remove the list of events, the terminal sends a terminal response of command beyond terminal's capabilities. When one of the events in the current list occurs, then the terminal uses an event download mechanism to transfer details of the event to the UICC.

For the event list byte coding, a plurality of values are defined in addition to those defined for 3GPP within TS 31.111. More specifically, the values can further include a byte value of 11 for an I-WLAN access status event, a value of 12 for a network rejection event, a value of 15 for a CSG cell selection event and a placeholder value of 1z for IMS Registration event.

The ME then includes the IARIs of the supported applications on the UICC in the SIP REGISTER request pursuant to 3GPP TS 24.229. The ME receives a 200 OK that contains the P-Associated-URI list. The ME sends a SUBSCRIBE for the Registration event package. The ME receives a 200 OK message.

The ME then receives the initial SIP NOTIFY associated with the initial IMS registration event. The body of which includes a list of registered IMPUs and the <unknown param> field can contain media feature tags including the registered ICSI and registered IARI values. The ME sends a 200 OK and sends the IMS registration notification to the UICC.

If the IMS Registration event is part of the current event list (as set up by the last set up event list command, then, upon receiving the initial SIP NOTIFY after a SIP REGISTER message, the terminal informs the UICC that this event has occurred, by using the EVENLOPE (EVENT DOWNLOAD-IMS registration) command. The direction of the command is ME to UICC and the command header is specified in 3GPP TS 31.111. Additionally, the structure of the EVELOPE (EVENT DOWNLOAD-IMS registration) command is set forth in Table 11.

Command parameters/data.

TABLE 11

| Description | Clause | M/O | Min | Length |
| --- | --- | --- | --- | --- |
| Event download tag | 9.1 | M | Y | 1 |
| Length (A + B + (C or D or I) + E + F + G + H) + J | — | M | Y | 1 |
| Event list | 8.25 | M | Y | A |
| Device identities | 8.7 | M | Y | B |
| IMPU lists | 8.9X | M | Y | G |

Event list: the Event list data object contains only one event (value part of length 1 byte), and terminal sets the event to:
IMS Registration Event.
Device identities: the terminal sets the device identities to:
source: Network;
destination: UICC.
IMPU: This data object contains the list of IMPUs received in the 200 OK message in the unknown-param element.
Response parameters/data: None for this type of ENVELOPE command.

Additionally, the registered IMPUs are set forth in Table 12.

TABLE 12

| Byte(s) | Description | Length |
| --- | --- | --- |
| 1 | IMPU List Tag | 1 |
| 2 | Length | X |
| 3 | IMPU tag | Y |
| 4 | IMPU length | Z |
| .. | : | ... |
| ... | ... | ... |

Contents:
List of all the IMPUs received in the SIP NOTIFY message
Coding:
IMPU values shall be coded as defined in 3GPP TS 24.229.

Figure 17:
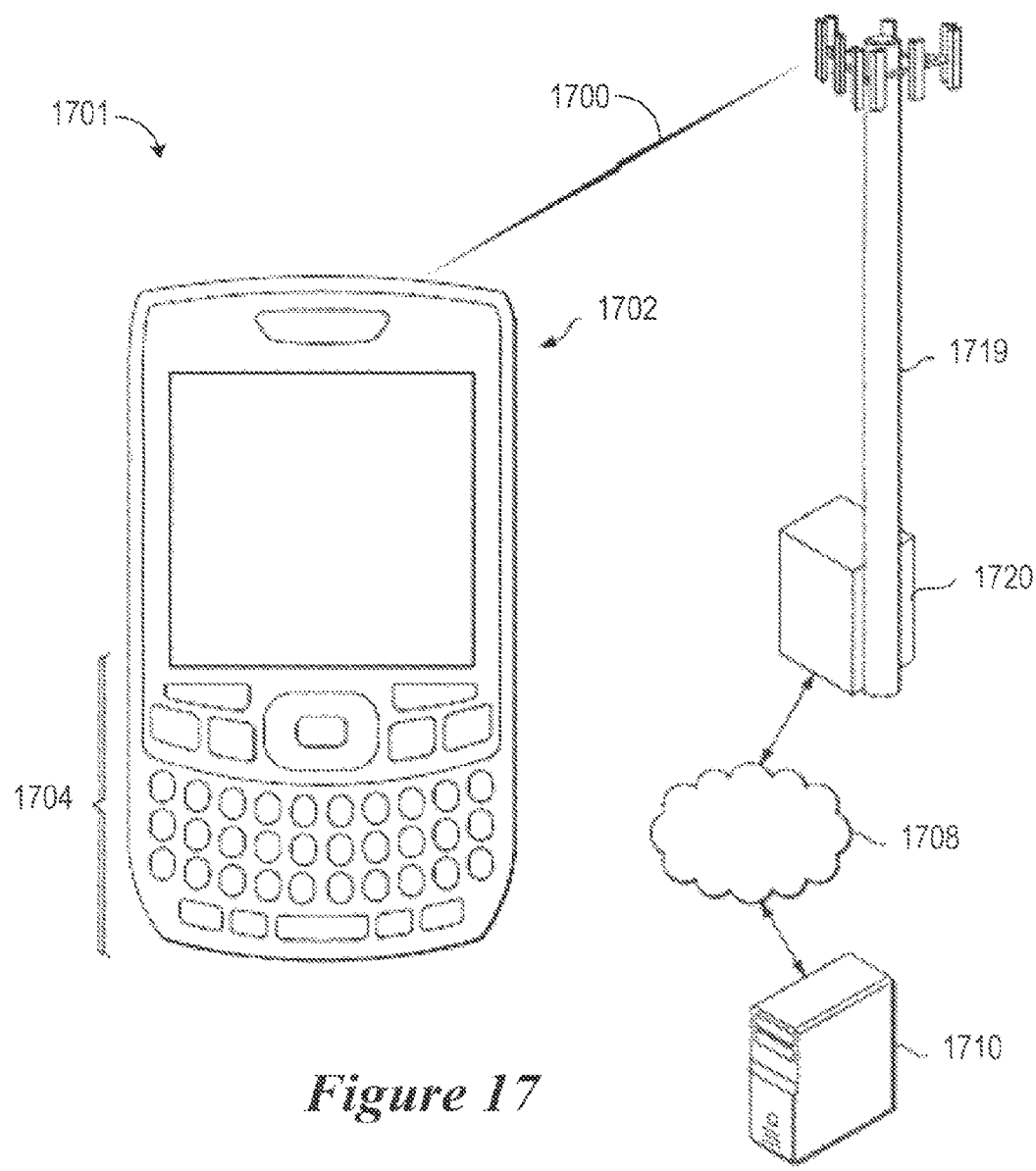
FIG. 17 shows a diagram of a wireless communications system including a UE operable for some of the various embodiments of the disclosure.

FIG. 17 illustrates a wireless communications system including an embodiment of user agent (UA) 1701. UA 1701 is operable for implementing aspects of the disclosure, but the disclosure should not be limited to these implementations. Though illustrated as a mobile phone, the UA 1701 may take various forms including a wireless handset, a pager, a personal digital assistant (PDA), a portable computer, a tablet computer, a laptop computer. Many suitable devices combine some or all of these functions. In some embodiments of the disclosure, the UA 1701 is not a general purpose computing device like a portable, laptop or tablet computer, but rather is a special-purpose communications device such as a mobile phone, a wireless handset, a pager, a PDA, or a telecommunications device installed in a vehicle. The UA 1701 may also be a device, include a device, or be included in a device that has similar capabilities but that is not transportable, such as a desktop computer, a set-top box, or a network node. The UA 1701 may support specialized activities such as gaming, inventory control, job control, and/or task management functions, and so on.

The UA 1701 includes a display 1702. The UA 1701 also includes a touch-sensitive surface, a keyboard or other input keys generally referred as 1704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 1701 may present options for the user to select, controls for the user to actuate, and/or cursors or other indicators for the user to direct.

The UA 1701 may further accept data entry from the user, including numbers to dial or various parameter values for configuring the operation of the UA 1701. The UA 1701 may further execute one or more software or firmware applications in response to user commands. These applications may configure the UA 1701 to perform various customized functions in response to user interaction. Additionally, the UA 1701 may be programmed and/or configured over-the-air, for example from a wireless base station, a wireless access point, or a peer UA 1701.

Among the various applications executable by the UA 1701 are a web browser, which enables the display 1702 to show a web page. The web page may be obtained via wireless communications with a wireless network access node 1719, such as a cell tower, a peer UA 1701, or any other wireless communication network or system 1700. The network 1700 is coupled to a wired network 1708, such as the Internet. Via the wireless link and the wired network, the UA 1701 has access to information on various servers, such as a server 1710. The server 1710 may provide content that may be shown on the display 1702. Alternately, the UA 1701 may access the network 1700 through a peer UA 1701 acting as an intermediary, in a relay type or hop type of connection.

Figure 18:
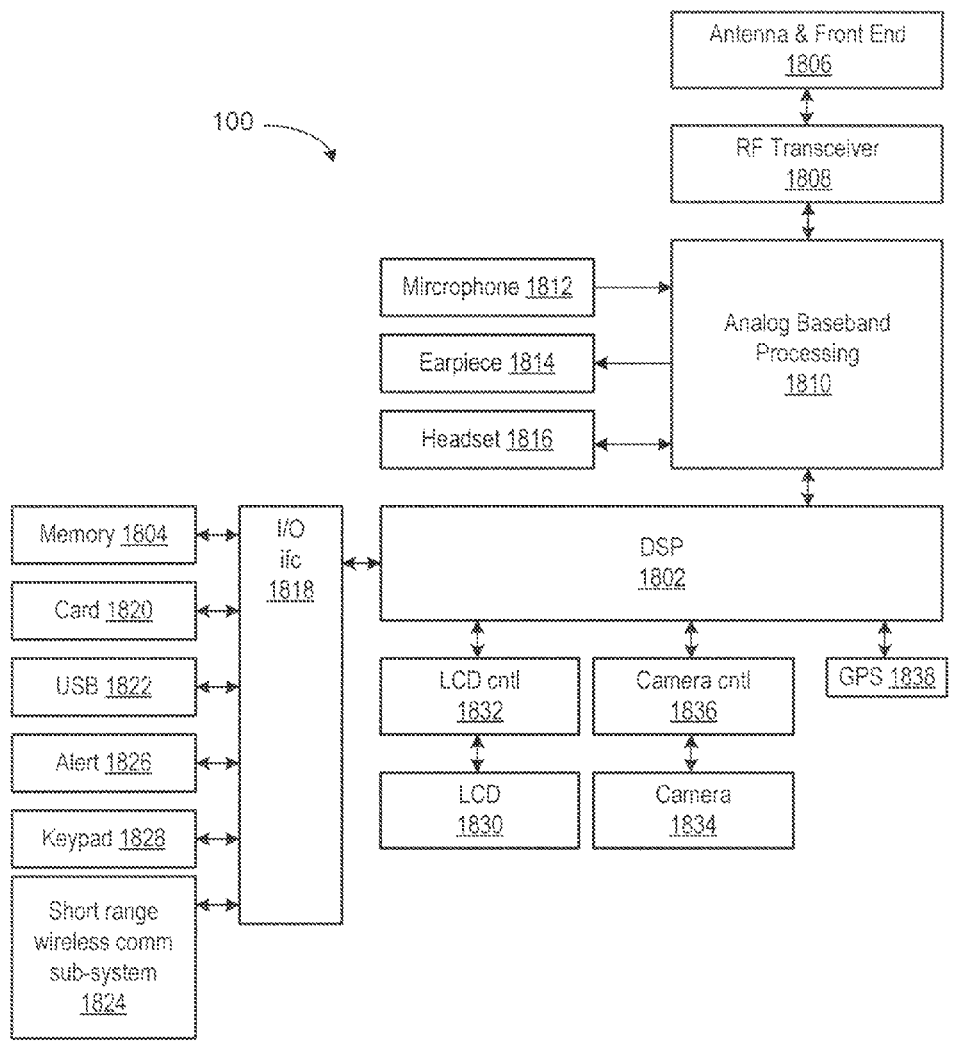
FIG. 18 shows a block diagram of a UE operable for some of the various embodiments of the disclosure.

FIG. 18 shows a block diagram of the UA 1701. While a variety of known components of UAs 1701 are depicted, in an embodiment a subset of the listed components and/or additional components not listed may be included in the UA 1701. The UA 1701 includes a digital signal processor (DSP) 1802 and a memory 1804. As shown, the UA 1701 may further include an antenna and front end unit 1806, a radio frequency (RF) transceiver 1808, an analog baseband processing unit 1810, a microphone 1812, an earpiece speaker 1814, a headset port 1816, an input/output interface 1818, a removable memory card 1820, a universal serial bus (USB) port 1822, a short range wireless communication sub-system 1824, an alert 1826, a keypad 1828, a liquid crystal display (LCD), which may include a touch sensitive surface 1830, an LCD controller 1832, a charge-coupled device (CCD) camera 1834, a camera controller 1836, and a global positioning system (GPS) sensor 1838. In an embodiment, the UA 1701 may include another kind of display that does not provide a touch sensitive screen. In an embodiment, the DSP 1802 may communicate directly with the memory 1804 without passing through the input/output interface 1818. It will be appreciated that a UA which includes a memory card 1820 is generally referred to as a UE whereas a UA which does not include the memory card 1820 is generally referred to as a ME. In other words, a UE is the combination of an ME as well as a memory card.

The DSP 1802 or some other form of controller or central processing unit operates to control the various components of the UA 1701 in accordance with embedded software or firmware stored in memory 1804 or stored in memory contained within the DSP 1802 itself. In addition to the embedded software or firmware, the DSP 1802 may execute other applications stored in the memory 1804 or made available via information carrier media such as portable data storage media like the removable memory card 1820 or via wired or wireless network communications. The application software may comprise a compiled set of machine-readable instructions that configure the DSP 1802 to provide the desired functionality, or the application software may be high-level software instructions to be processed by an interpreter or compiler to indirectly configure the DSP 1802.

The antenna and front end unit 1806 may be provided to convert between wireless signals and electrical signals, enabling the UA 1701 to send and receive information from a cellular network or some other available wireless communications network or from a peer UA 1701. In an embodiment, the antenna and front end unit 1806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 1806 may include antenna tuning and/or impedance matching components, RF power amplifiers, and/or low noise amplifiers.

The RF transceiver 1808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 1810 and/or the DSP 1802 or other central processing unit. In some embodiments, the RF Transceiver 1808, portions of the Antenna and Front End 1806, and the analog base band processing unit 1810 may be combined in one or more processing units and/or application specific integrated circuits (ASICs).

The analog baseband processing unit 1810 may provide various analog processing of inputs and outputs, for example analog processing of inputs from the microphone 1812 and the headset 1816 and outputs to the earpiece 1814 and the headset 1816. To that end, the analog baseband processing unit 1810 may have ports for connecting to the built-in microphone 1812 and the earpiece speaker 1814 that enable the UA 1701 to be used as a cell phone. The analog baseband processing unit 1810 may further include a port for connecting to a headset or other hands-free microphone and speaker configuration. The analog baseband processing unit 1810 may provide digital-to-analog conversion in one signal direction and analog-to-digital conversion in the opposing signal direction. In some embodiments, at least some of the functionality of the analog baseband processing unit 1810 may be provided by digital processing components, for example by the DSP 1802 or by other central processing units.

The DSP 1802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 1802 may perform modulation, coding, interleaving, and spreading, and for a receiver function the DSP 1802 may perform despreading, deinterleaving, decoding, and demodulation. In another embodiment, for example in an orthogonal frequency division multiplex access (OFDMA) technology application, for the transmitter function the DSP 1802 may perform modulation, coding, interleaving, inverse fast Fourier transforming, and cyclic prefix appending, and for a receiver function the DSP 1802 may perform cyclic prefix removal, fast Fourier transforming, deinterleaving, decoding, and demodulation. In other wireless technology applications, yet other signal processing functions and combinations of signal processing functions may be performed by the DSP 1802.

The DSP 1802 may communicate with a wireless network via the analog baseband processing unit 1810. In some embodiments, the communication may provide Internet connectivity, enabling a user to gain access to content on the Internet and to send and receive e-mail or text messages. The input/output interface 1818 interconnects the DSP 1802 and various memories and interfaces. The memory 1804 and the removable memory card 1820 may provide software and data to configure the operation of the DSP 1802. Among the interfaces may be the USB interface 1822 and the short range wireless communication sub-system 1824. The USB interface 1822 may be used to charge the UA 1701 and may also enable the UA 1701 to function as a peripheral device to exchange information with a personal computer or other computer system. The short range wireless communication sub-system 1824 may include an infrared port, a Bluetooth interface, an IEEE 202.11 compliant wireless interface, or any other short range wireless communication sub-system, which may enable the UA 1701 to communicate wirelessly with other nearby mobile devices and/or wireless base stations.

The input/output interface 1818 may further connect the DSP 1802 to the alert 1826 that, when triggered, causes the UA 1701 to provide a notice to the user, for example, by ringing, playing a melody, or vibrating. The alert 1826 may serve as a mechanism for alerting the user to any of various events such as an incoming call, a new text message, and an appointment reminder by silently vibrating, or by playing a specific pre-assigned melody for a particular caller.

The keypad 1828 couples to the DSP 1802 via the interface 1818 to provide one mechanism for the user to make selections, enter information, and otherwise provide input to the UA 1701. The keyboard 1828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 1830, which may include touch screen capability and also display text and/or graphics to the user. The LCD controller 1832 couples the DSP 1802 to the LCD 1830.

The CCD camera 1834, if equipped, enables the UA 1701 to take digital pictures. The DSP 1802 communicates with the CCD camera 1834 via the camera controller 1836. In another embodiment, a camera operating according to a technology other than Charge Coupled Device cameras may be employed. The GPS sensor 1838 is coupled to the DSP 1802 to decode global positioning system signals, thereby enabling the UA 1701 to determine its position. Various other peripherals may also be included to provide additional functions, e.g., radio and television reception.

Figure 19:
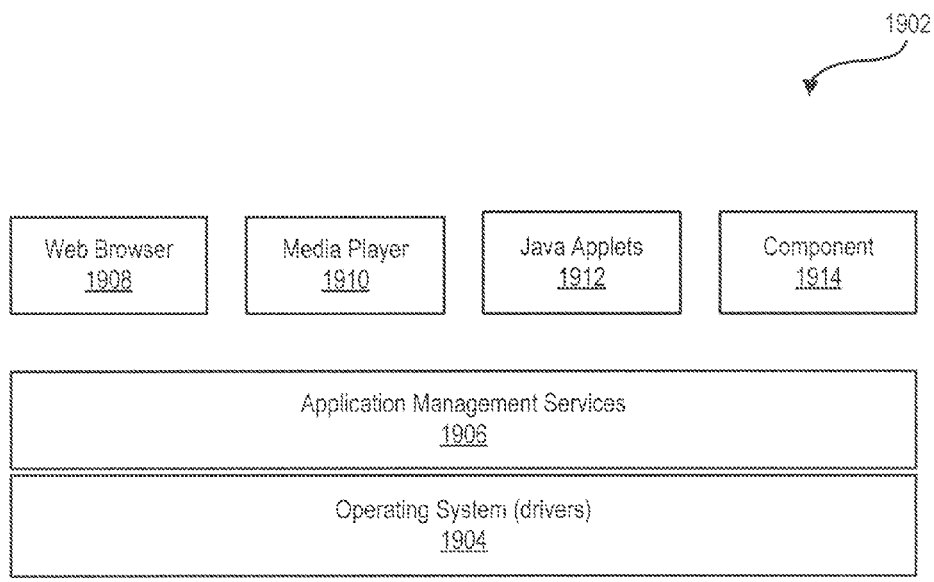
FIG. 19 shows a diagram of a software environment that may be implemented on a UE operable for some of the various embodiments of the disclosure.

FIG. 19 illustrates a software environment 1902 that may be implemented by the DSP 1802. The DSP 1802 executes operating system drivers 1904 that provide a platform from which the rest of the software operates. The operating system drivers 1904 provide drivers for the UA hardware with standardized interfaces that are accessible to application software. The operating system drivers 1904 include application management services (AMS) 1906 that transfer control between applications running on the UA 1701. Also shown in FIG. 19 are a web browser application 1908, a media player application 1910, and Java applets 1912. The web browser application 1908 configures the UA 1701 to operate as a web browser, allowing a user to enter information into forms and select links to retrieve and view web pages. The media player application 1910 configures the UA 1701 to retrieve and play audio or audiovisual media. The Java applets 1912 configure the UA 1701 to provide games, utilities, and other functionality. A component 1914 might provide functionality described herein.

Figure 20:
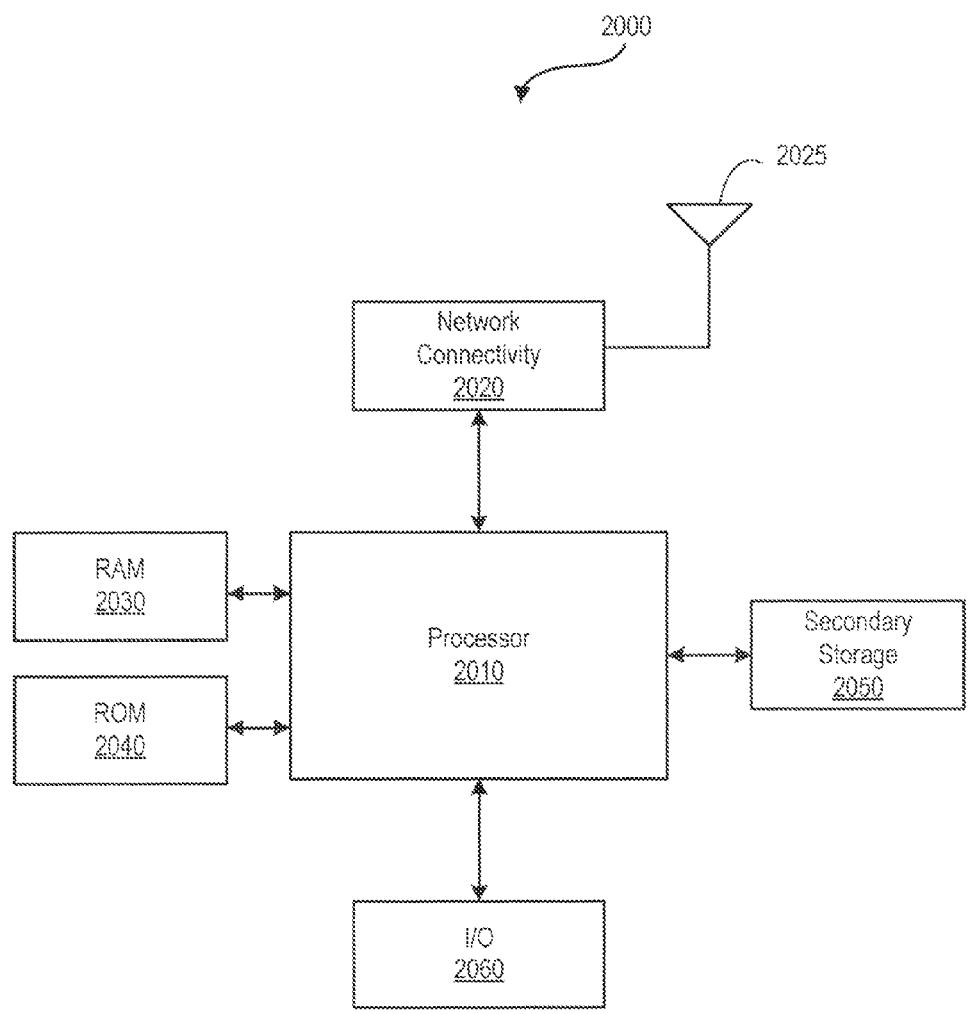
FIG. 20 shows a block diagram of an illustrative general purpose computer system suitable for some of the various embodiments of the disclosure.

The UA 1701, base station 1720, and other components described above might include a processing component that is capable of executing instructions related to the actions described above. FIG. 20 illustrates an example of a system 2000 that includes a processing component 2010 suitable for implementing one or more embodiments disclosed herein. In addition to the processor 2010 (which may be referred to as a central processor unit (CPU or DSP), the system 2000 might include network connectivity devices 2020, random access memory (RAM) 2030, read only memory (ROM) 2040, secondary storage 2050, and input/output (I/O) devices 2060. In some cases, some of these components may not be present or may be combined in various combinations with one another or with other components not shown. These components might be located in a single physical entity or in more than one physical entity. Any actions described herein as being taken by the processor 2010 might be taken by the processor 2010 alone or by the processor 2010 in conjunction with one or more components shown or not shown in the drawing.

The processor 2010 executes instructions, codes, computer programs, or scripts that it might access from the network connectivity devices 2020, RAM 2030, ROM 2040, or secondary storage 2050 (which might include various disk-based systems such as hard disk, floppy disk, or optical disk). While only one processor 2010 is shown, multiple processors may be present. Thus, while instructions may be discussed as being executed by a processor, the instructions may be executed simultaneously, serially, or otherwise by one or multiple processors. The processor 2010 may be implemented as one or more CPU chips.

The network connectivity devices 2020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 2020 may enable the processor 2010 to communicate with the Internet or one or more telecommunications networks or other networks from which the processor 2010 might receive information or to which the processor 2010 might output information.

The network connectivity devices 2020 might also include one or more transceiver components 2025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 2025 might include separate receiving and transmitting units or a single transceiver. Information transmitted or received by the transceiver 2025 may include data that has been processed by the processor 2010 or instructions that are to be executed by processor 2010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 2030 might be used to store volatile data and perhaps to store instructions that are executed by the processor 2010. The ROM 2040 is a non-volatile memory device that typically has a smaller memory capacity than the memory capacity of the secondary storage 2050. ROM 2040 might be used to store instructions and perhaps data that are read during execution of the instructions. Access to both RAM 2030 and ROM 2040 is typically faster than to secondary storage 2050. The secondary storage 2050 is typically comprised of one or more disk drives or tape drives and might be used for non-volatile storage of data or as an over-flow data storage device if RAM 2030 is not large enough to hold all working data. Secondary storage 2050 may be used to store programs that are loaded into RAM 2030 when such programs are selected for execution.

The I/O devices 2060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 2025 might be considered to be a component of the I/O devices 2060 instead of or in addition to being a component of the network connectivity devices 2020. Some or all of the I/O devices 2060 may be substantially similar to various components depicted in the previously described drawing of the UA 1701, such as the display 1702 and the input 1704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present invention has been described in detail, it should be understood that various changes, substitutions and alterations can be made hereto without departing from the spirit and scope of the invention as defined by the appended claims.

What is claimed is:

1. A method for consolidating session initiation protocol (SIP) messages comprising:
   reading, by a mobile equipment (ME), an elementary file to inform the ME of Internet Protocol (IP) multimedia subsystem (IMS) applications installed on a universal integrated circuit card (UICC), wherein the elementary file includes IMS application reference identifiers (IARIs) for the IMS applications;
   registering the IMS applications and supported communication services via a single IMS registration;
   when any associated IARI is added or removed at a later time, receiving notification that the elementary file is updated; and,
   upon receipt of the notification, updating registration with an IMS network to add or remove an associated IARI.

2. The method of claim 1 wherein
   the elementary file comprises at least one of a IMS SIM (ISIM) elementary file or a universal terrestrial radio access network (UTRAN) SIM (USIM) elementary file.

3. The method of claim 1 wherein:
   the notification is performed via a refresh command.

4. The method of claim 1 further comprising
   populating an elementary file that contains one or more active applications identified by one or more IARIs.

5. The method of claim 1 further comprising
   using an event download to notify the UICC of incoming data, the event download notifying the UICC of any incoming data on any given application identified by the IARI; and,
   registering, via the UICC, an incoming data event on the ME.

6. The method of claim 1 further comprising
   using an event download to notify the UICC of an IMS registration event, the event download notifying the UICC of any IMS registration event identified by one of a 200 OK message and a SIP NOTIFY message; and,
   registering, via the UICC, the IMS registration event on the ME.

7. A method for introducing a file to a subscriber identity module (SIM) comprising
   introducing an elementary file in an SIM to indicate an Internet Protocol (IP) multimedia subsystem (IMS) communication service identifier (ICSI) to a mobile equipment (ME), the elementary file containing all supported communication services identified by the;
   reading, via the ME, the elementary file so as to become aware of a presence of IMS communication services to be supported by applications on a universal integrated circuit card (UICC);
   when any associated IARI is added or removed at a later time, receiving notification that the elementary file is updated; and,
   upon receipt of the notification, updating registration with an IMS network to add or remove an associated IARI.

8. The method of claim 7 wherein
   the elementary file comprises at least one of an IMS SIM (ISIM) elementary file and a universal terrestrial radio access network (UTRAN) SIM (USIM) elementary file.

9. The method of claim 8 wherein
   if the ISIM elementary is not present, then using the USIM elementary file.

10. The method of claim 9 further comprising
    populating an elementary file that contains all supported communications services identified by the ICSI.

11. The method of claim 7 further comprising
using an event download to notify the UICC of incoming data, the event download notifying the UICC of any incoming data on any given application identified by the ICSI; and,
registering, via the UICC, an incoming data event on the ME.

12. The method of claim 7 further comprising
using an event download to notify the UICC of an IMS registration event, the event download notifying the UICC of any IMS registration event identified by one of a 200 OK message and a SIP NOTIFY message; and,
registering, via the UICC, the IMS registration event on the ME.

13. A method for introducing a file to a subscriber identity module (SIM) comprising:
 reading, via a mobile equipment(ME), an Internet Protocol multimedia subsystem (IMS) communication service identifier (ISCI) elementary file, the ICSI elementary file containing all supported communications services identified by the ICSI; and wherein
 when an associated ICSI is added or removed at a later time, the elementary file is updated and a notification is sent to the ME; and,
 upon receipt of the notification, the ME updates a corresponding IMS registration using a SIP REGISTER messages to add or remove the associated ICSI.

14. The method of claim 13 wherein
the ME reads the ISCI elementary file at boot up to become aware of the presence of IMS communication services to be supported by applications on a universal integrated circuit card (UICC).

15. The method of claim 13 wherein
the notification is performed via a refresh command.

16. A method for introducing a file to a subscriber identity module (SIM) comprising:
 reading, via a mobile equipment(ME), an elementary file, the elementary file indicating universal integrated circuit card (UICC) internet protocol multimedia subsystem (IMS) application reference identifier (IARI) to the ME; and wherein
 when an associated IARI is added or removed at a later time, the elementary file is updated and a notification is sent to the ME; and,
 upon receipt of the notification, the ME updates a corresponding IMS registration using a SIP REGISTER messages to add or remove the associated IARI.

17. The method of claim 16 wherein
the ME reads the elementary file at boot up to become aware of a presence of IMS communication services to be supported by applications on a universal integrated circuit card (UICC).

18. The method of claim 16 wherein
the notification is performed via a refresh command.

19. The method of claim 7 wherein:
the notification is performed via a refresh command.

20. The method of claim 13 wherein:
the notification is performed via a refresh command.

21. The method of claim 16 wherein:
the notification is performed via a refresh command.

* * * * *

UNITED STATES PATENT AND TRADEMARK OFFICE
CERTIFICATE OF CORRECTION

PATENT NO. : 8,606,319 B2  
APPLICATION NO. : 13/384709  
DATED : December 10, 2013  
INVENTOR(S) : Syed Hussain Ali, Jean-Philippe Paul Cormier and Andrew Michael Allen It is certified that error appears in the above-identified patent and that said Letters Patent is hereby corrected as shown below:

In the Claims

Column 22, Line 19, In Claim 2, delete "a IMS" and insert -- an IMS --, therefor.

Column 22, Line 48, In Claim 7, after "services identified by the" insert -- ICSI --, therefor.

Column 23, Line 18, In Claim 13, delete "(ISCI)" and insert -- (ICSI) --, therefor.

Column 23, Lines 25-26, In Claim 13, delete "SIP REGISTER messages" and insert -- SIP REGISTER message --, therefor.

Column 23, Line 28, In Claim 14, delete "ISCI" and insert -- ICSI --, therefor.

Column 24, Line 8, In Claim 16, delete "(IMS) application reference identifier (IARI) to the ME" and insert -- (IMS) application reference identifiers (IARIs) to the ME --, therefor.

Column 24, Lines 14-15, In Claim 16, delete "SIP REGISTER messages" and insert -- SIP REGISTER message --, therefor.

Signed and Sealed this  
Seventeenth Day of April, 2018

Andrei Iancu  
*Director of the United States Patent and Trademark Office*